(12) United States Patent
Hilbert et al.

(10) Patent No.: US 10,474,316 B2
(45) Date of Patent: Nov. 12, 2019

(54) USER INTERFACE FEATURES IN A SYSTEM OF CONCURRENT GAMES

(71) Applicant: Bally Gaming, Inc., Las Vegas, NV (US)

(72) Inventors: Scott T. Hilbert, Sparks, NV (US); Joseph R. Hedrick, Reno, NV (US); David Ponce, Las Vegas, NV (US); Yogendrasinh Hematji Rajput, Bangalore (IN); Prateek Kumar Baishkhiyar, Jharkhand (IN); Ravi Subramanian, Bangalore (IN); Pratima Mary Yedluri, Bangalore (IN)

(73) Assignee: Bally Gaming, Inc., Las Vegas, NV (US)

( * ) Notice: Subject to any disclaimer, the term of this patent is extended or adjusted under 35 U.S.C. 154(b) by 87 days.

(21) Appl. No.: 15/799,751

(22) Filed: Oct. 31, 2017

(65) Prior Publication Data

US 2018/0052582 A1    Feb. 22, 2018

Related U.S. Application Data

(63) Continuation of application No. 14/499,007, filed on Sep. 26, 2014, now Pat. No. 9,811,236.

(51) Int. Cl.
*A63F 9/24* (2006.01)
*G06F 3/0481* (2013.01)
(Continued)

(52) U.S. Cl.
CPC ........ *G06F 3/04812* (2013.01); *G06F 3/0482* (2013.01); *G06F 3/0488* (2013.01);
(Continued)

(58) Field of Classification Search
CPC ...... G07F 17/32; G07F 17/34; G07F 17/3204; G07F 17/3213
See application file for complete search history.

(56) References Cited

U.S. PATENT DOCUMENTS

| 5,823,873 | A | 10/1998 | Moody |
| 5,997,401 | A | 12/1999 | Crawford |

(Continued)

FOREIGN PATENT DOCUMENTS

| WO | 2010/056892 A1 | 5/2010 |
| WO | 2014/065909 A1 | 5/2014 |

OTHER PUBLICATIONS

International Preliminary Report on Patentability, dated Oct. 16, 2010, for International Application No. PCT/US2009/064246, 14 pages.

(Continued)

*Primary Examiner* — Lawrence S Galka
(74) *Attorney, Agent, or Firm* — Marvin A. Hein; Michael Blankstein

(57) ABSTRACT

A video gaming system is disclosed that includes one or more game processors, one or more video displays, an apparatus for a player to control the play of the game, and a memory device. The memory device stores a set of fixed instructions to control the game processor and is configured to: enable the player to interact with the game interface to select a game from a list of games offered by the video gaming machine, wherein the game is represented by a game bubble floating in the game interface; display a game selection interface to enable the player to select the game and add the game in a control panel, wherein the control panel is configured to display multiple games selected by the
(Continued)

player; and enable the player to switch among the plurality of games and control a game play of the plurality of games concurrently.

17 Claims, 26 Drawing Sheets

(51) Int. Cl.
G07F 17/32 (2006.01)
G06F 3/0488 (2013.01)
G06F 3/0482 (2013.01)

(52) U.S. Cl.
CPC ...... *G06F 3/04817* (2013.01); *G06F 3/04883* (2013.01); *G06F 3/04886* (2013.01); *G07F 17/3204* (2013.01); *G07F 17/3209* (2013.01); *G07F 17/3213* (2013.01); *G07F 17/3262* (2013.01); *G07F 17/3293* (2013.01)

(56) References Cited

U.S. PATENT DOCUMENTS

| | | |
|---|---|---|
| 6,159,095 A | 12/2000 | Frohm et al. |
| 6,203,428 B1 | 3/2001 | Giobbi et al. |
| 6,270,412 B1 | 8/2001 | Crawford et al. |
| 6,652,378 B2 | 11/2003 | Cannon et al. |
| 6,656,040 B1 | 12/2003 | Brosnan et al. |
| 6,755,738 B2 | 6/2004 | Glasson et al. |
| 6,832,957 B2 | 12/2004 | Falconer |
| 6,860,810 B2 | 3/2005 | Cannon et al. |
| 6,921,334 B1 | 7/2005 | Bennett |
| 7,156,735 B2 | 1/2007 | Brosnan et al. |
| 7,156,741 B2 | 1/2007 | Hornik et al. |
| 7,513,828 B2 | 4/2009 | Nguyen et al. |
| 7,594,851 B2 | 9/2009 | Falconer |
| 7,625,280 B2 | 12/2009 | Singer et al. |
| 7,901,294 B2 | 3/2011 | Walker et al. |
| RE42,351 E | 5/2011 | Bryant |
| 8,460,092 B1 | 6/2013 | Slomiany |
| 8,545,319 B2 | 10/2013 | Kaneko |
| 9,345,960 B2 | 5/2016 | Lark |
| 2002/0077170 A1 | 6/2002 | Johnson et al. |
| 2002/0183105 A1 | 12/2002 | Cannon et al. |
| 2004/0048645 A1 | 3/2004 | Webb et al. |
| 2004/0152509 A1 | 8/2004 | Hornik et al. |
| 2005/0054419 A1 | 3/2005 | Souza et al. |
| 2005/0075167 A1 | 4/2005 | Beaulieu et al. |
| 2005/0181860 A1 | 8/2005 | Nguyen et al. |
| 2006/0183532 A1 | 8/2006 | Jackson |
| 2007/0077984 A1 | 4/2007 | Aida et al. |
| 2007/0173310 A1 | 7/2007 | Walker et al. |
| 2008/0009334 A1 | 1/2008 | Walker et al. |
| 2008/0051186 A1 | 2/2008 | Okada |
| 2008/0064480 A1 | 3/2008 | Randall |
| 2008/0070665 A1 | 3/2008 | Gatto et al. |
| 2008/0113741 A1 | 5/2008 | Beadell et al. |
| 2008/0113805 A1 | 5/2008 | David et al. |
| 2008/0318656 A1 | 12/2008 | Walker et al. |
| 2010/0124978 A1 | 5/2010 | DePalma et al. |
| 2011/0218034 A1* | 9/2011 | Barclay ............ G07F 17/32 463/25 |
| 2011/0283238 A1 | 11/2011 | Weising |
| 2013/0023337 A1 | 1/2013 | Bowers et al. |
| 2014/0094256 A1 | 4/2014 | Hilbert et al. |
| 2017/0169662 A1* | 6/2017 | Froy ............ G06F 3/005 |

OTHER PUBLICATIONS

International Search Report and Written Opinion, dated Jan. 6, 2010, for International Application No. PCT/US2009/064246, 8 pages.

* cited by examiner

USER INTERFACE FEATURES IN A SYSTEM OF CONCURRENT GAMES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The present disclosure pertains generally to electronic gaming machines (EGMs). More particularly, the present disclosure relates to a graphical user interface of EGMs or electronic gaming terminals that provide interactive features to allow a player to play multiple games concurrently.

BACKGROUND

There are numerous types of electronic gaming machines (EGMs) and gaming terminals that people play for entertainment or economic purposes. Computer-controlled games generally provide richer experiences to game players. Such experiences include coordinated multi-media experience, more challenging games, extended, multi-session gaming, virtual experiences that combine reality with fantasy, faster-than-normal experiences, more immersive experiences, and so forth.

Historically, a single gaming machine plays only one game for a single player. Modern EGMs are computer controlled, thus they can provide flexible, engaging, and entertaining user interface features to game players. In particular, an EGM can be configured to play multiple games concurrently for a single player, a single game for multiple players, or multiple games for multiple players. The user interface of such an EGM supports features that were not necessary for a single-player and single-game configuration. Examples of features of such a user interface include interactive visual presentation to attract game players, capability to switch among multiple games, control features for betting wagers and pay-outs, and information display for multiple games that are played concurrently. A game player can concurrently enjoy multiple games intuitively and interactively while not being distracted by complex control features of the user interface provided by an EGM.

SUMMARY

Briefly, and in general terms, disclosed herein are systems and methods for providing a video gaming system. The system includes: one or more game processors; one or more video displays; a player input device configured to enable a player to control play of the game; and a memory device that stores software to control the game processor. The memory device further storing software that is configured to: enable the player to interact with the game interface to select a game from a list of games offered by the video gaming machine, wherein the game is represented by a game bubble floating in the game interface; display a game selection interface to enable the player to select the game and add the game in a control panel, wherein the control panel is configured to display multiple games selected by the player; and enable the player to switch among the plurality of games and control a game play of the plurality of games concurrently.

In another embodiment, a method of playing a video gaming system is disclosed that includes one or more game processors, one or more video displays, a player input device configured to enable a player to control play of the game, and a memory device that stores software and controls the game processor. The method includes: enabling the player to select a virtual game to play from a plurality of virtual games on a virtual game floor; displaying play by the player of the selected game on the one or more video displays; displaying virtual gameplay of the non-selected games from the plurality of virtual games on a virtual game floor; displaying on the one or more video displays an outcome history of the play of the selected games; and enabling the player to choose to begin playing a non-selected game instead of the selected game from the plurality of virtual games on a virtual game floor.

The disclosed embodiments further relate to machine readable media on which are stored embodiments of the disclosed invention described in herein. It is contemplated that any media suitable for retrieving instructions is within the scope of the disclosed embodiments. By way of example, such media may take the form of magnetic, optical, or semiconductor media. The disclosed embodiments also relate to data structures that contain embodiments of the disclosed invention, and to the transmission of data structures containing embodiments of the disclosed invention.

Further advantages of the disclosed embodiments will be brought out in the following portions of the specification, wherein the detailed description is for the purpose of fully disclosing the various embodiments without placing limitations thereon.

BRIEF DESCRIPTION OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Figure 1:
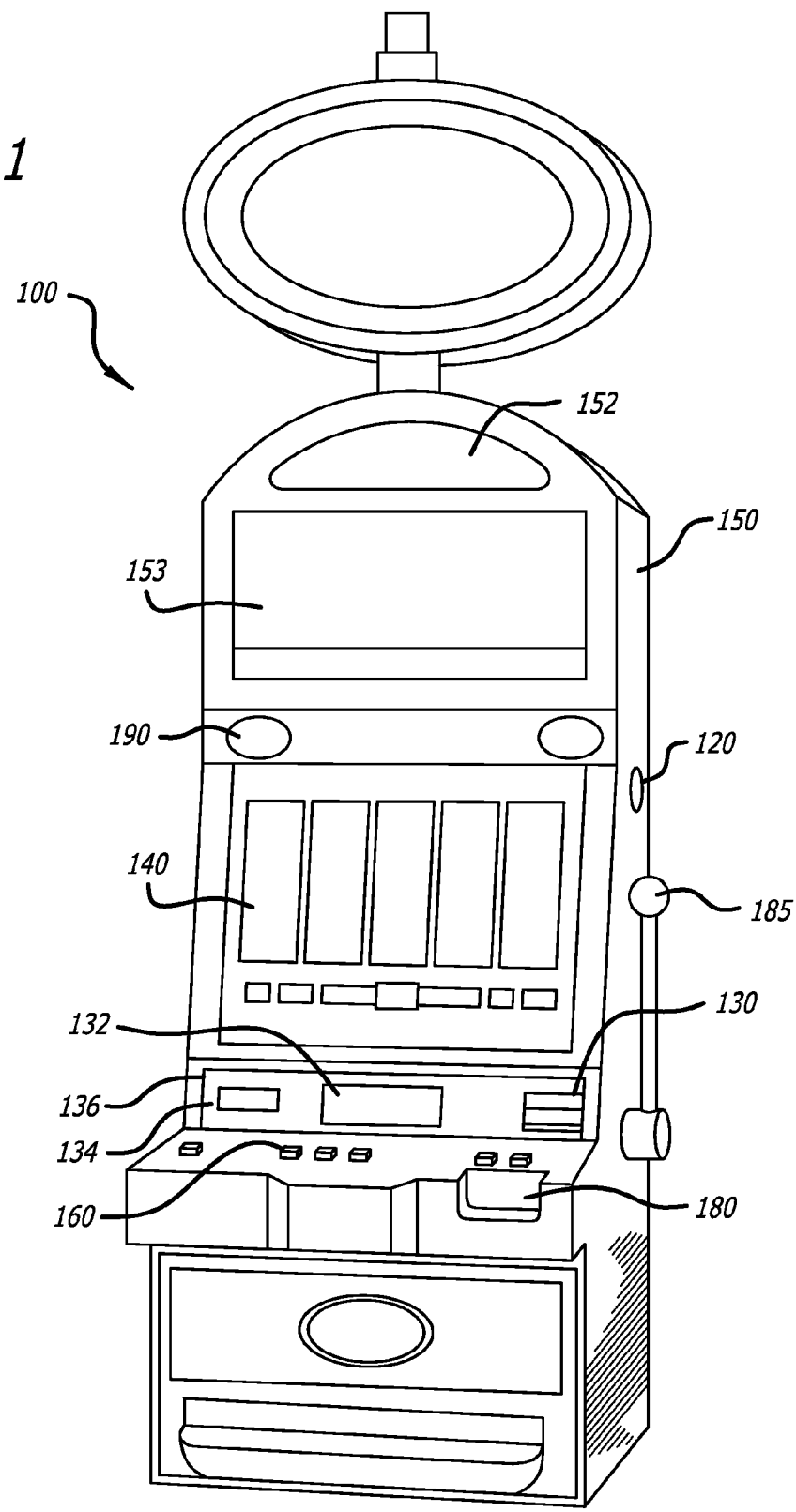
FIG. 1 illustrates a perspective view of a gaming machine in accordance with one or more embodiments.

Persons of ordinary skill in the art will understand that the present disclosure is illustrative only and not in any way limiting. Other embodiments of the presently disclosed system and method readily suggest themselves to such skilled persons having the benefit of this disclosure.

Each of the features and teachings disclosed herein can be utilized separately or in conjunction with other features and teachings to provide a system and method to provide user-configurable rules for team play on a single gaming machine. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 illustrates a perspective view of a gaming machine in accordance with one or more embodiments. A gaming machine 100 capable of supporting various embodiments is shown, including cabinet housing 120, primary game display 140 upon which a primary game and feature game may be displayed, top box 150 which may display multiple progressives that may be won during play of the feature game, player-activated buttons 160, player tracking panel 136, bill/voucher acceptor 180 and one or more speakers 190. Cabinet housing 120 may be a self-standing unit that is generally rectangular in shape and may be manufactured with reinforced steel or other rigid materials which are resistant to tampering and vandalism. Cabinet housing 120 may alternatively be a handheld device including the gaming functionality as discussed herein and including various components described herein. For example, a handheld device may be a cell phone, personal data assistant, or laptop or tablet computer, each of which may include a display, a processor, and memory sufficient to support either stand-alone capability such as gaming machine 100 or thin client capability such as that incorporating some of the capability of a remote server.

In one or more embodiments, cabinet housing 120 houses a processor, circuitry, and software (not shown) for receiving signals from the player-activated buttons 160, operating the games, and transmitting signals to the respective displays and speakers. Any shaped cabinet may be implemented with any embodiment of gaming machine 100 so long as it provides access to a player for playing a game. For example, cabinet 120 may comprise a slant-top, bar-top, or table-top style cabinet, including a Bally Cinevision™ or CineReels™ cabinet. The operation of gaming machine 100 is described more fully below.

The plurality of player-activated buttons 160 may be used for various functions such as, but not limited to, selecting a wager denomination, selecting a game to be played, selecting a wager amount per game, initiating a game, or cashing out money from gaming machine 100. Buttons 160 may be operable as input mechanisms and may include mechanical buttons, electromechanical buttons or touch screen buttons. Optionally, a handle 185 may be rotated by a player to initiate a game.

In one or more embodiments, buttons 160 may be replaced with various other input mechanisms known in the art such as, but not limited to, a touch screen system, touch pad, track ball, mouse, switches, toggle switches, or other input means used to accept player input such as a Bally iDeck™. One other example input means is a universal button module as disclosed in U.S. Patent Publication No. 20060247047, entitled "Universal Button Module," filed on Apr. 14, 2005. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 120 may optionally include top box 150 which contains "top glass" 152 comprising advertising or payout information related to the game or games available on gaming machine 100. Player tracking panel 136 includes player tracking card reader 134 and player tracking display 132. Voucher printer 130 may be integrated into player tracking panel 136 or installed elsewhere in cabinet housing 120 or top box 150.

Game display 140 may present a game of chance wherein a player receives one or more outcomes from a set of potential outcomes. For example, one such game of chance is a video slot machine game. In other aspects of the disclosed embodiments, gaming machine 100 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 140 is, typically, a CRT or a flat-panel display in the form of, but not limited to, liquid crystal, plasma, electroluminescent, vacuum fluorescent, field emission, or any other type of panel display known or developed in the art. Game display 140 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference in its entirety for all purposes.

Game display 140 may also present information such as, but not limited to, player information, advertisements and casino promotions, graphic displays, news and sports updates, or even offer an alternate game. This information may be generated through a host computer networked with gaming machine 100 on its own initiative or it may be obtained by request of the player using either one or more of the plurality of player-activated buttons 160; the game display itself, if game display 140 comprises a touch screen or similar technology; buttons (not shown) mounted about game display 140 which may permit selections such as those found on an ATM machine, where legends on the screen are associated with respective selecting buttons; or any player input device that offers the required functionality.

Cabinet housing 120 incorporates a single game display 140. However, in alternate embodiments, cabinet housing 120 or top box 150 may house one or more additional displays 153 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 4A:
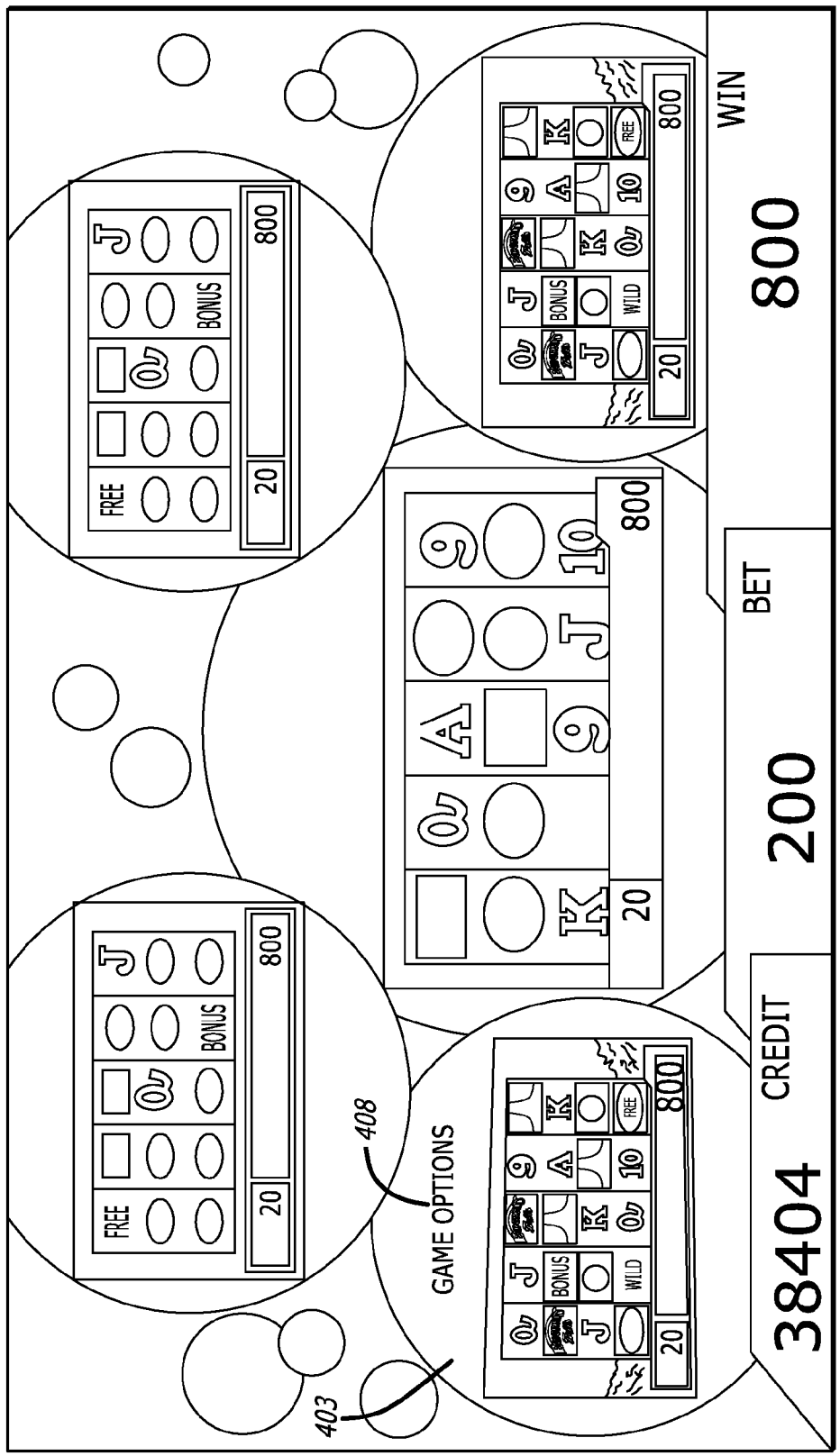
FIGS. 4A and 4B illustrate a play mode of an exemplary gaming interface in accordance with one or more embodiments.
Figure 4B:
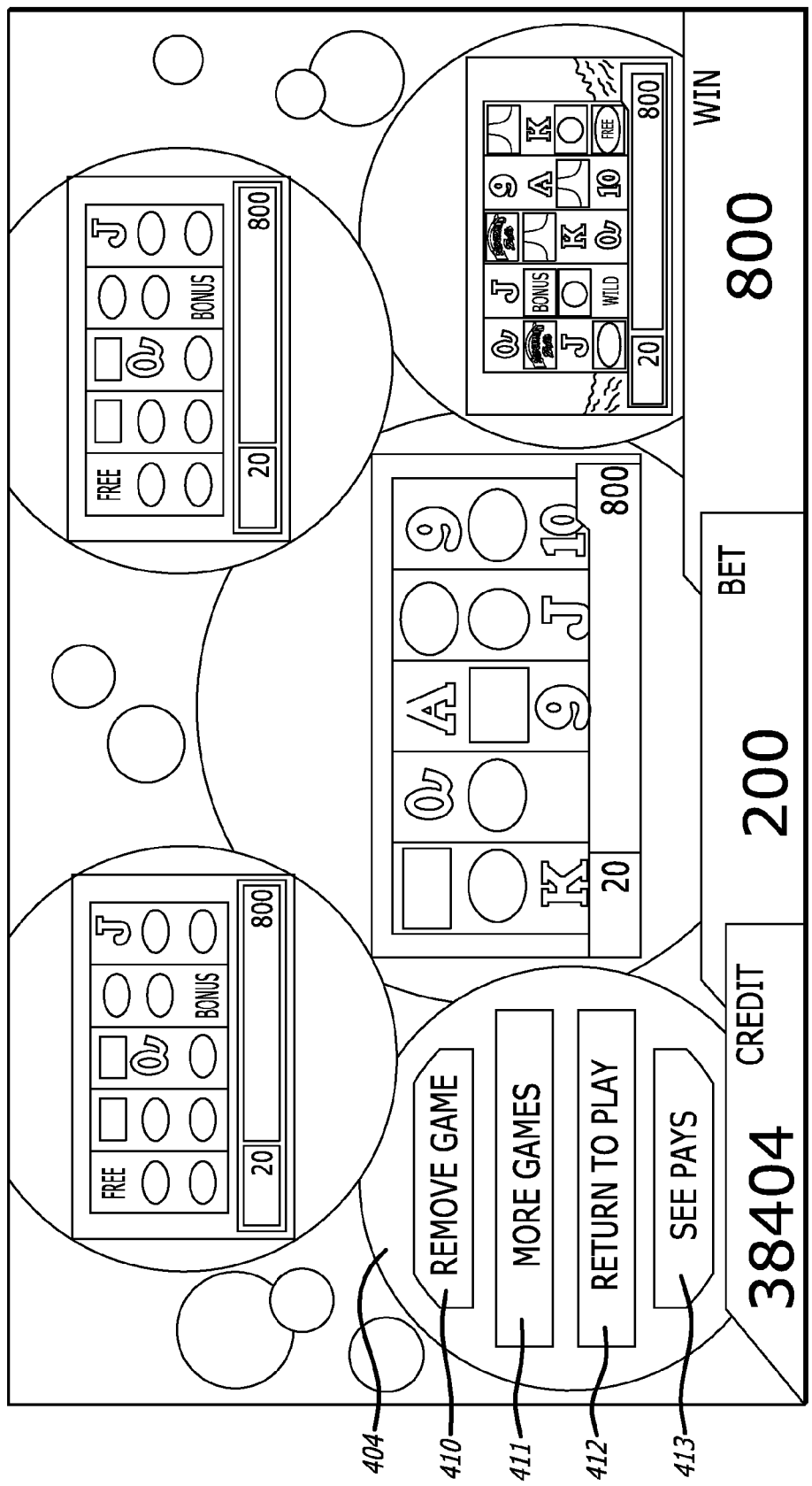
Figure 5:
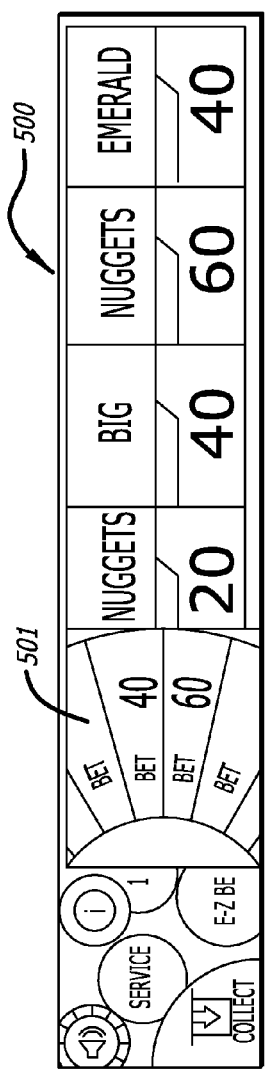
FIG. 5 illustrates a betting wheel displayed in a game tile of an iDeck in accordance with one or more embodiments.

FIGS. 2-9 illustrate various embodiments of user interfaces for supporting concurrent games. The present user interface provides various features including, but are not limited to, a game flip, a betting wheel, a dynamically expandable bet interface, a dynamic increase of a game screen based on a wager amount, a display of a progressive level and amounts, floating bubbles that give a bonus point when touched, make a game icon wiggle when touched, minimize and pause the betting/spin of a game temporarily, and keep the games minimized for Take 'n Play such that only one game can be shown on a screen as shown in FIG. 5. According to some embodiments, a game bubble is moved by a touch and hold of a game bubble on the main display. A touch of a longer than 1 second causes the touched game bubble to wiggle. The player drags the wiggling game bubble to any position in the main display. The release of the touch causes the game bubble to snap to the nearest appropriate game position.

Figure 2:
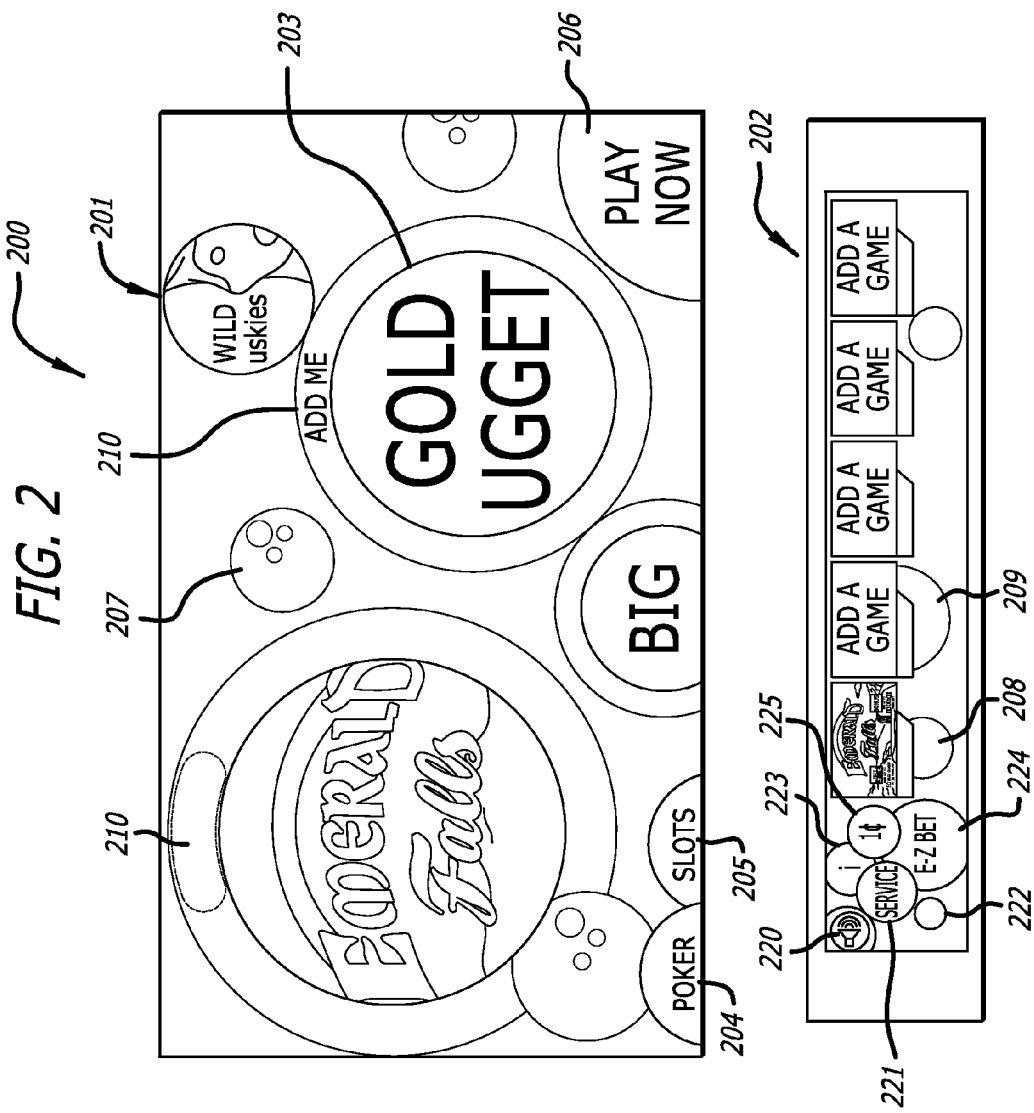
FIG. 2 illustrates an exemplary gaming user interface in an attract mode, in accordance with some embodiments.

FIG. 2 illustrates an exemplary gaming user interface in an attract mode, in accordance with some embodiments. The gaming user interface allows a player to interact with a gaming machine that can concurrently play one or more games. The one or more games played by the gaming machine may appear in various display sizes on the gaming user interface depending on the mode of a game play such as an attract mode, a game selection mode, a game play mode, and the like.

The gaming user interface 200 includes a main display 201 and a control panel 202 herein referred to as iDeck. The attract mode gaming user interface 200 displays animated features such as floating game bubbles 203 including a game logo and smaller empty bubbles 207. These floating bubbles float from the bottom of the main screen 201 towards the top of the main screen 201 in a random motion with animated visual and auditory effects. Contrary to a conventional gaming user interface in which a player finds a game machine that plays a specific game or select a game from a list of games that can be played by a gaming machine, the gaming user interface 200 provides a player an opportunity to select a game through a discovery process in which a list of machine-offered games appear via the floating bubble interface, and a player selects from the list of machine-offered games.

The gaming user interface 200 provides a touch interface of a gaming machine for game selection. A player to select one or more games to play by clicking on the screen of the gaming machine and popping game bubbles of his/her interest via the floating bubble interface. The game bubbles 203 contain various game themes offered at the gaming machine and float on the main display 201 to the top of the main display 201. On the top display, the game bubbles may float upward and disappear, pop to reveal simulated spins of the game, or rotate to reveal additional animations, bonus information, progressive values or additional features of the game.

According to one embodiment, the main display 201 displays random clear bubbles 207. The player touches and pops the clear bubbles 207. A bubble pop sound accompanies the bubble pop animation. The clear bubble 207 represents a special bubble such as a "Surprise me" bubble, an "Easter Egg," and a mystery bubble. Those special bubbles show a surprise animation or a special effect (e.g., mystery bubbles) to attract more player engagement. The special features may include, but are not limited to, winning comps, adding play, seeing new games, and other game options.

In the attract mode, the gaming user interface 200 displays floating game bubbles to provide a teaser interaction for a player to touch and pop a game bubble 203 and add the game to play. The player has an option to choose between poker games and slot games. Due to the difference in bet interfaces and button panel interaction, the present gaming user interface the games to be played in either a slot game mode or a poker game mode, but not a mix of the slot and poker game modes. When the player chooses poker games by clicking on the poker game button 204, game bubbles 203 of poker games appear. Similarly, when the player clicks on the slot game button 205, game bubbles of slot games appear. It is noted that other types of games other than poker games or slot games may be available to the player in other embodiments.

The main display 201 of the gaming user interface 200 also shows a poker game mode button 204, a slot game mode button 205, and a "Play Now" button 206. The poker/slot selection 204 and 205 switches between a poker game mode and a slot game mode and indicates the selected game mode by highlighting the graphics, or changing the color or hue. Once the player selects or touches a game bubble 203, the game bubble 203 pops with a popping sound and fills the game tile in the iDeck 202 after bursting from the main display 201. The selected game bubble 203 is shown in the game tile of the iDeck 202 with a static bubble icon 208. The player may touch and pop a static bubble icon 208 to remove it from the game selection. A transparent empty bubble 209 is shown in the iDeck 202 depicting a position of a game to be added to the iDeck 202.

The selected game by the player by popping a game bubble is added to a game folder on the iDeck 202. To start a game on the game folder on the iDeck 202, the player touches the "Play Now" button 206 or hit a spin button (not shown). The player may immediately touch the "Play Now" button 206 or hit the spin button without selecting any game, then a default game launches in a single game mode.

The "Play Now" button 206 launches a game play with a default game if no game bubble is selected. If a game bubble 203 is selected in the iDeck 202, the "Play Now" button 206 launches the selected game. The "Cash In" button (not shown) from an attract mode user interface also launches the game play in a default game. According to one embodiment, one game bubble is a default game and floats on the main display 201. The default game bubble may slowly move up and down, side to side bouncing off the screen boundary, pushing other bubbles out of the way. Other game bubbles rise up and disappear off at the top of the main display 201, and new game bubbles appearing from the bottom of the main display 201. As game bubbles move within the main display 201 to the top, some bubbles may burst onto the top screen and show simulated reel spins, a bonus round animation, or exhibit any other special effect to draw an attention from a player, and fade away.

The background graphics of the main display 201 and/or the iDeck 202 give an appearance related to the theme of the game bubbles. For example, the background graphics shows a sky or an air scene with related graphic elements and animations such as clouds. The game bubbles 203 are of various sizes and represent the corresponding games with color graphics and/or animations.

According to one embodiment, the game bubble 203 has a halo with a text "Add Me" 210. The game image on a game bubble 203 may show the complete game logo for better identification. The game bubbles 203 float upward at various speeds (e.g., 4-10 seconds) depending on the game configuration. For example, a popular game or a newly-added game may float at a slower speed than other games. In another example, one of the game bubbles 203 remains in the main display 201 at all times and represents the default game of the gaming machine. The default game may have a different size and floating motion from other non-default game bubbles. The default game is loaded if a player did not pick a game and touches the "Play Now" button 206 or hits a spin button (not shown). If the player adds games to the iDeck 202 and touches the "Play Now" button 206 or hits the spin button, the game that the player currently selected plays. Sufficient credit must be available for at least one wager for the player to enter a play mode. If no sufficient credit is available, the gaming interface prompts a message, and/or audible instruction to add credits to play the game. The iDeck 202 shows five game tiles (or slots). When all the game tiles are filled, the attract game bubbles 203 gray out disabling further selection and "Play Now" button 206 flashes to alert the player that the game tiles are full. In another embodiment. The player may add more than five games in the iDeck 202, and the game slots expand to accommodate additional game(s).

The iDeck 202 incorporates betting with volume, information and denomination controls and other controls and functions as the primary user control for wagering as well as service and general utility functions. The iDeck 202 includes the first game preloaded, and four other game spots populate based on the selection on the main screen. The iDeck 202 includes several controls including a volume control 220, a service button 221, a collect button 222, information button 223, an EZ-bet button 224, and a denomination button 225. The volume control 220 allows a player to raise the volume of the game machine in one increment per each touch until a full volume is achieved and resets the volume on the next touch to minimize the volume. The service button 221 initiates a service call. The collect button 222 generates a printed ticket for the amount of credits remaining on the gaming machine. The information button 223 brings up a help menu for the gaming user interface. The EZ-bet button 224 changes the iDeck 202 wagering interface in a game play mode to an EZ-bet mode. The denomination button 225 changes the denomination of an active game or games in the attract/wheel modes. The player scrolls through available denomination. If a game is not available in the newly selected denomination, the game is grayed out with a message "denomination not supported" displayed on the game bubble. The player has an option to leave the games in place and continue to play with some games disabled, remove them, or select an alternative game(s). This provides the ability for the player to have games of multiple denominations selected and change between them without having to leave the game play mode and re-enter the game selection. Game denomination changes may be made while all games are idle and the change of game denomination is not available if any of the selected game is spinning.

The EZ-bet function provides a simplified bet interface where a play covers all lines on all games at the same credit per line wager. When EZ-bet is selected, individual game tables/icons are replaced with a five button bet interface. The five button bet interface displays the wager values for all lines covered for games selected. Button 1 on the left represents one credit per line, with 2, 3, 4, and 5 credits per line buttons moving to the right. FIGS. 8A-8D show an exemplary EZ-bet interface in accordance with some embodiments.

A game tile in iDeck 202 may be removed in various ways. For example, touching the game tile flips the game tile and shows "Remove Game" button. Alternatively, when selected, the game tile shows an "X" icon that the player can click on to remove the selected game. If ignored, the "X" button on the game tile disappears after a predetermined interval.

According to some embodiments, a default game interface includes a pay table. The game display flips to show the pay table. If more than one game is being played, the player could touch a specific game pay table to make it a full size or significantly larger than other pay tables. This gives readability on a multi-game screen. In other embodiments, the player touches a "Touch-to-See Pay Table" icon to show the pay table.

The iDeck 202 includes total of 5 game locations although other numbers of game locations can be used in other embodiments. The player touches a game location in the iDeck 202 to add more games or bring up a game selection wheel. The first game may be preloaded and four other games spots can be activated to bring up the game selection screen.

Figure 3:
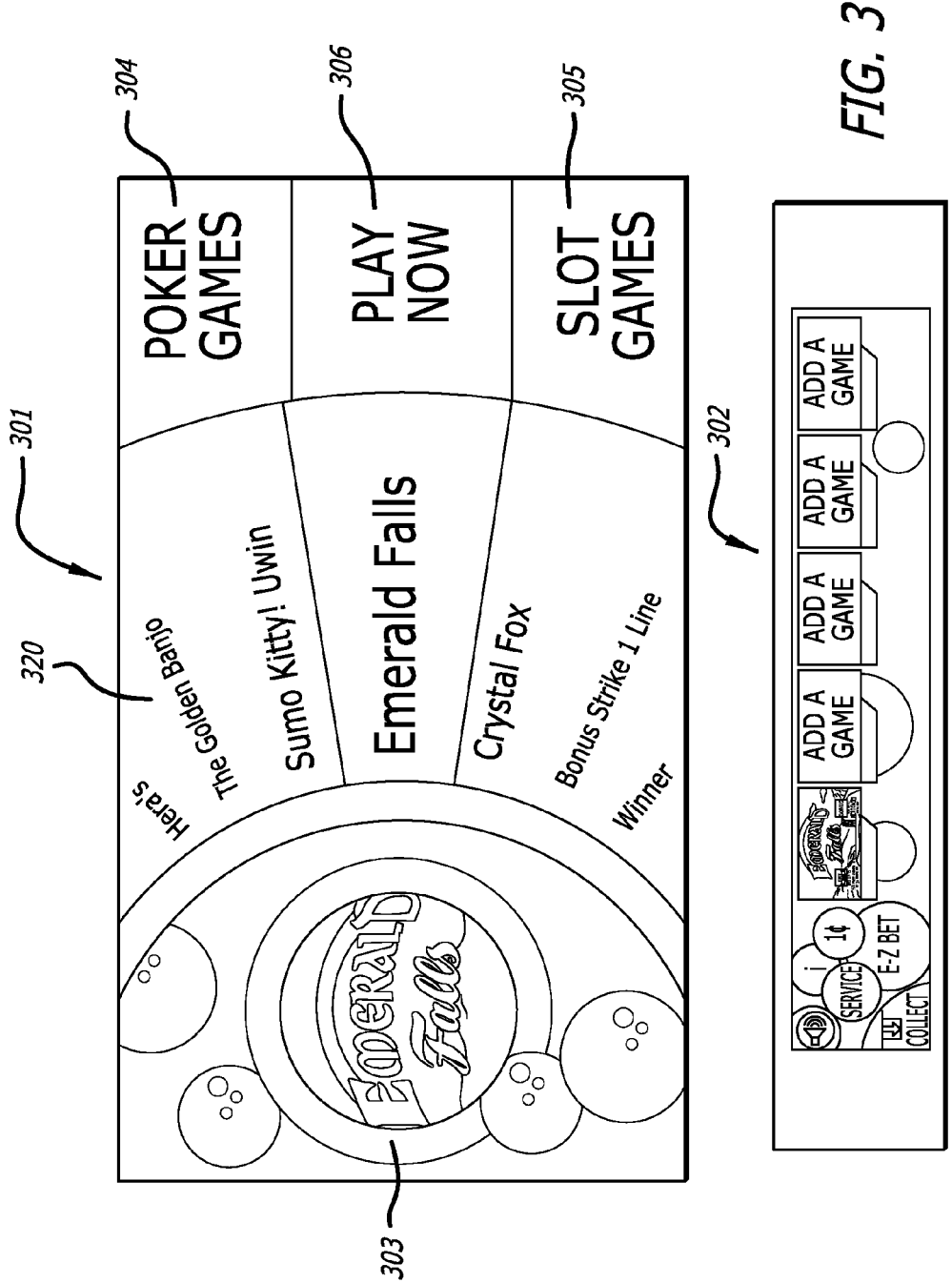
FIG. 3 illustrates an exemplary gaming user interface in a selection mode, in accordance with some embodiments.

FIG. 3 illustrates an exemplary gaming user interface in a selection mode, in accordance with some embodiments. The gaming user interface 301 incorporates a game selection wheel 320 (herein also referred to as "U-pick" wheel) and an iDeck 302. Each player-selected game is represented by an associated game icon on the iDeck 302. The game selection wheel 320 uses a graphical presentation of a roulette wheel that is familiar to gaming players but provides a unique use in selecting games for play. The game bubbles floats and animates in the floating area in a swirling motion as the player spins the game selection wheel 320.

The gaming user interface 301 has three sections. On the right of the gaming user interface 301, a poker game mode button 304, a slot game mode button 305, and a "Play Now" button 306 are displayed. The player may touch and/or drag the game selection wheel 320 to place a desired game at the wheel pointer. The player touches the "Play Now" button 306 to add a game and go to the game play mode or touch the "Cancel" button (not shown) to terminate the game selection wheel and return to the game play. If the game selection wheel was initiated from the attract mode, "Cancel" returns the player to attract mode if no games slots on the iDeck are filled. If one or more game slots are filled in the attract mode, "Cancel" launches the game play mode.

The game selection wheel 320 in the center section is where a player touches and drags the selection wheel to pick a game or games of interest. As the selection wheel spins (clockwise or counter clockwise), the game bubble 303 at the left section changes to show a graphical representation of the pointer centered game on the wheel. On the left section, there may appear a smaller bubble labelled "Surprise Me." Touching the large bubble on the left section adds the game to the iDeck 302 into one of the open game slots. Touching "Surprise Me" places a random game into one of the open game slots and launching a game play mode. The player scrolls the game selection wheel 320 to a desired game theme and touches the "Play Now" button 306 located on the right section, adding/changing the game and returning to a game play mode. Alternatively, the player may cancel the game selection wheel by touching the "Cancel" button (not shown) to exit the game selection mode and return to the mode where the player entered from. If no actions are taken (game selected or touch events) after two minutes, and no games are selected, the game interface returns to the attract mode. The right section of the gaming user interface 301 provides controls for selected poker or slot games as well as "Play Now" to switch to the game play mode.

FIGS. 4A and 4B illustrate a play mode of an exemplary gaming interface in accordance with one or more embodiments. When a pointer of the gaming machine is placed on a game bubble 403, a clickable "Game Options" button 408 appears. When the player clicks on the "Game Options" button 408, the game bubble 403 flips to show game options. The game option buttons include "Remove Game" 410, "More Games" 411, "Return to Play" 412, and "See Pays" 413. The "Remove Game" 410 removes the game instance and causes the remaining game instances to resize and realign on the main display. If there is only one game instance, and the game instance is removed, the game selection wheel appears on the main display. The "More Games" 411 brings up a game selection wheel (e.g., game selection of 320 of FIG. 3). The associated game tile on the iDeck is illuminated, highlighted, or differentiated graphically from other game tiles to indicate that the game slot is changed. The player has an option to change the game via a game selection wheel by touching the "Play Now" button to return to a game play. The "Return to Play" 412 makes the game window to flip back in a 3D fashion (e.g., rotating in a 3D space) to resume the game. The "See Pays" 413 is used to show the game rules for the selected game. The "See Pays" screen has an exit back to a game button to take the player back to the active game play mode. The "See Pays" for the selected game animates as a bubble from the bottom of the main display. The selected game bubble may be visible through the "See Pays" bubble. While the game options menu is flipped, wager changes and spins are disabled. The player must return to the game play mode for wagers and spins to become active.

FIG. 5 illustrates a betting wheel displayed in a game tile of an iDeck in accordance with one or more embodiments. To initiate a bet change, the player touches the lower half of a game bubble showing the bet amount of the corresponding game table. The game tile in the iDeck 500 reveals the betting wheel 501. A player may select a bet amount separately for each of the individual games that the player concurrently plays. The betting wheel 501 displays different denominations 20, 40, 60, 80, and the like, on the wheel segments. The player turns the betting wheel 501 and selects the desired denomination for a particular game. It enables the player to have many betting options for each game that is being played. While the betting wheel 501 is displayed, some of the iDeck controls such as denomination, collect, and EZ-bet are disabled while other controls such as service, volume and information are still enabled. The player touches and drags the wheel segment to rotate the wheel to a desired bet setting. Once the touch is removed, the bet amount is set after a predetermined interval (e.g., 2 seconds). This causes the betting wheel 501 to flip back over to the game tab on the iDeck 500. If a new touch on the bet wheel is received in less than the predetermined interval, the player may drag the wheel to a new bet setting. When a game tab is selected (flipped to bet wheel), the associated game on the main display is graphically highlighted, emphasized, or changed to indicate which game instance is being changed.

Figure 6A:
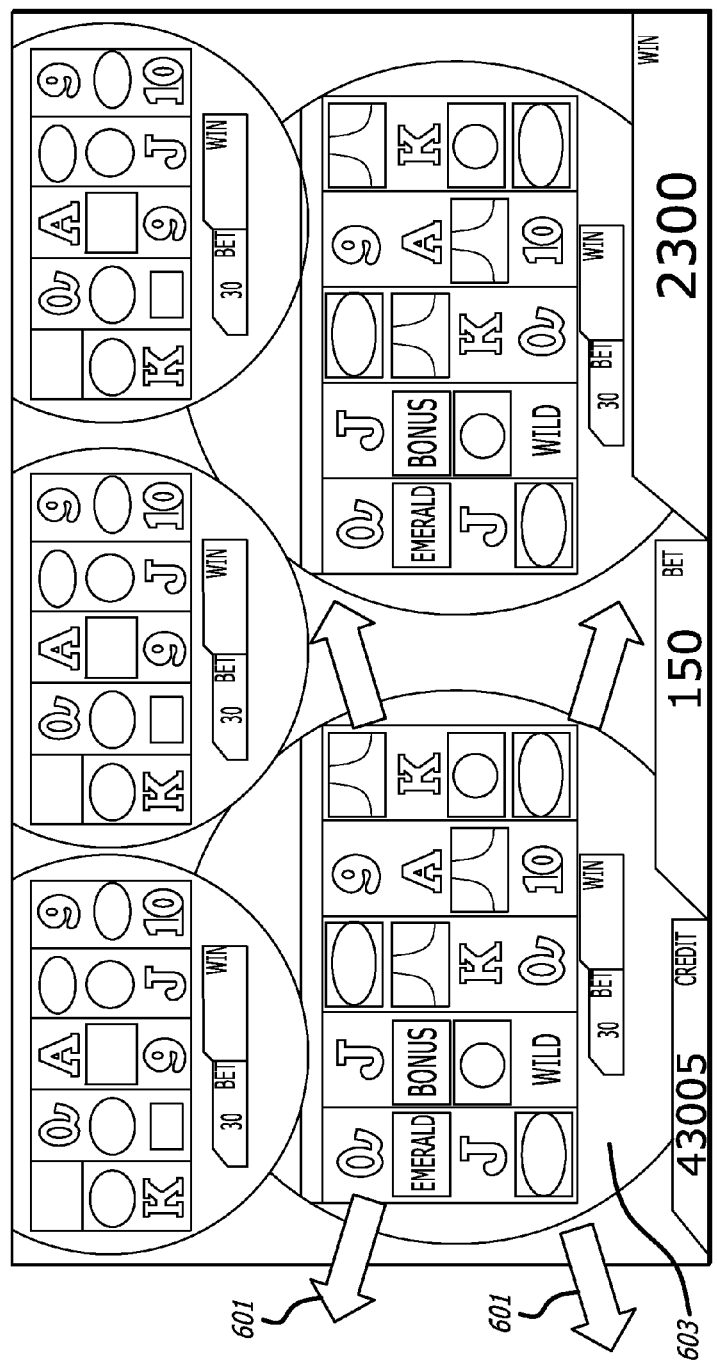
FIGS. 6A and 6B illustrate a dynamic resizing feature of the present user interface in accordance with some embodiments.
Figure 6B:
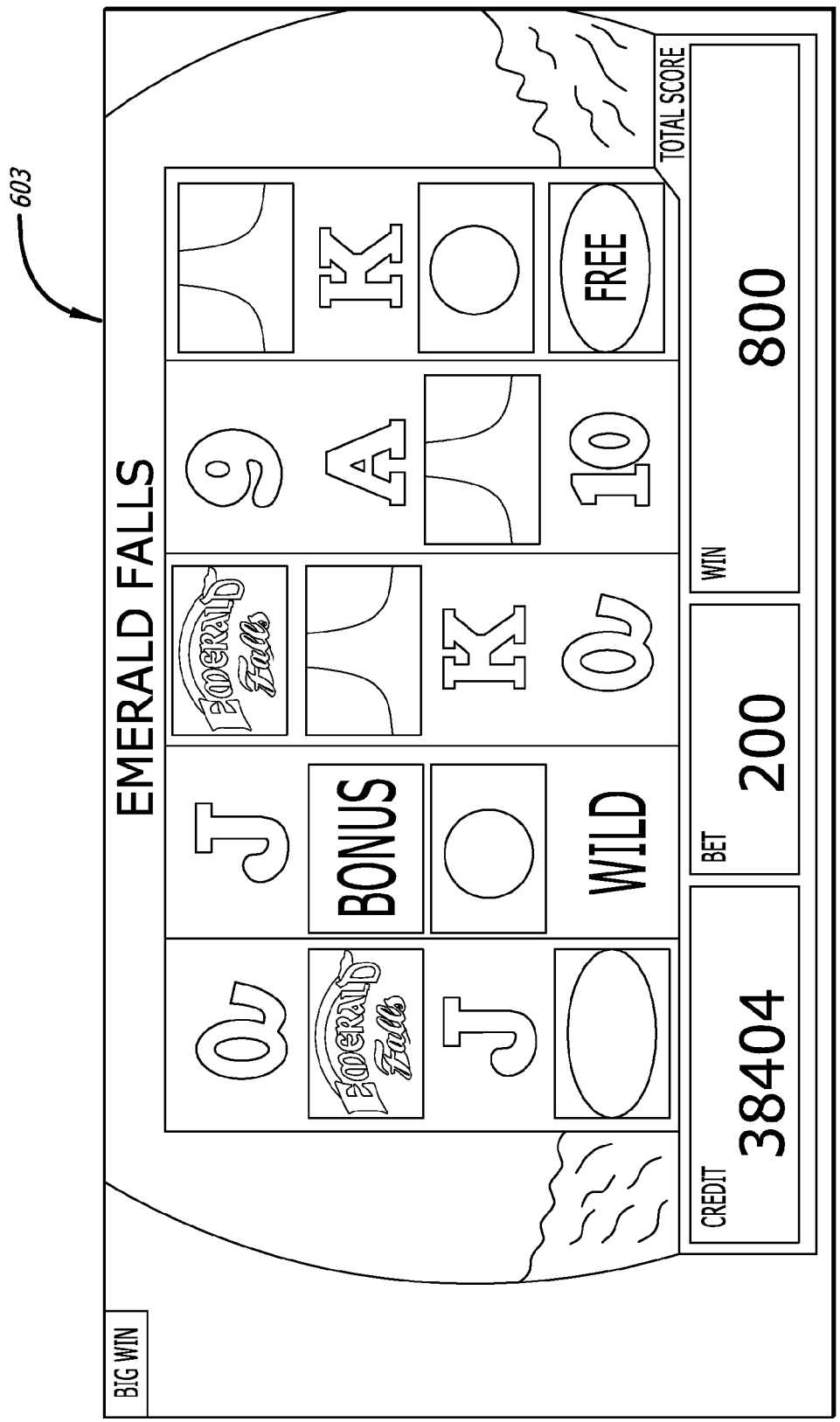

FIGS. 6A and 6B illustrate a dynamic resizing feature of the present user interface in accordance with some embodiments. The present gaming interface provides a betting interface that is dynamically expandable. The betting interface provides an iDeck for a player to individually bet on each of the games. Initially, the bet screen has game icons along with the current bet values the player wagers on each of the games being played.

In order to change the bet for a game, the player clicks on an area of the user interface that corresponds to the game. In response, the game interface for the game expands. The player can change his wager for the selected game using the expanded interface. When the player desires to play another game, the player clicks on another game to change the betting interface to play the selected game.

A portion of a game window is dynamically resized in a concurrent game set up in various events. For example, a game screen of a game with a higher bet amount is maximized to give the player the most attention. In another example, when a game is deleted, the remaining games are resized to occupy the space of the deleted game screen. In another example, the game screen of a game may be dynamically resized based on a game event.

Referring to FIG. 6A, the player clicks on a game bubble 603, and the game bubble is expanded as indicated by arrows 601 and displayed in a full screen mode as shown in FIG. 6B. It is noted that other user actions or game events may dynamically expand, shrink, or resize the game bubbles, minimize or maximize game bubbles, or display messages or notification to the player in an interactive and entertaining ways.

Figure 7:
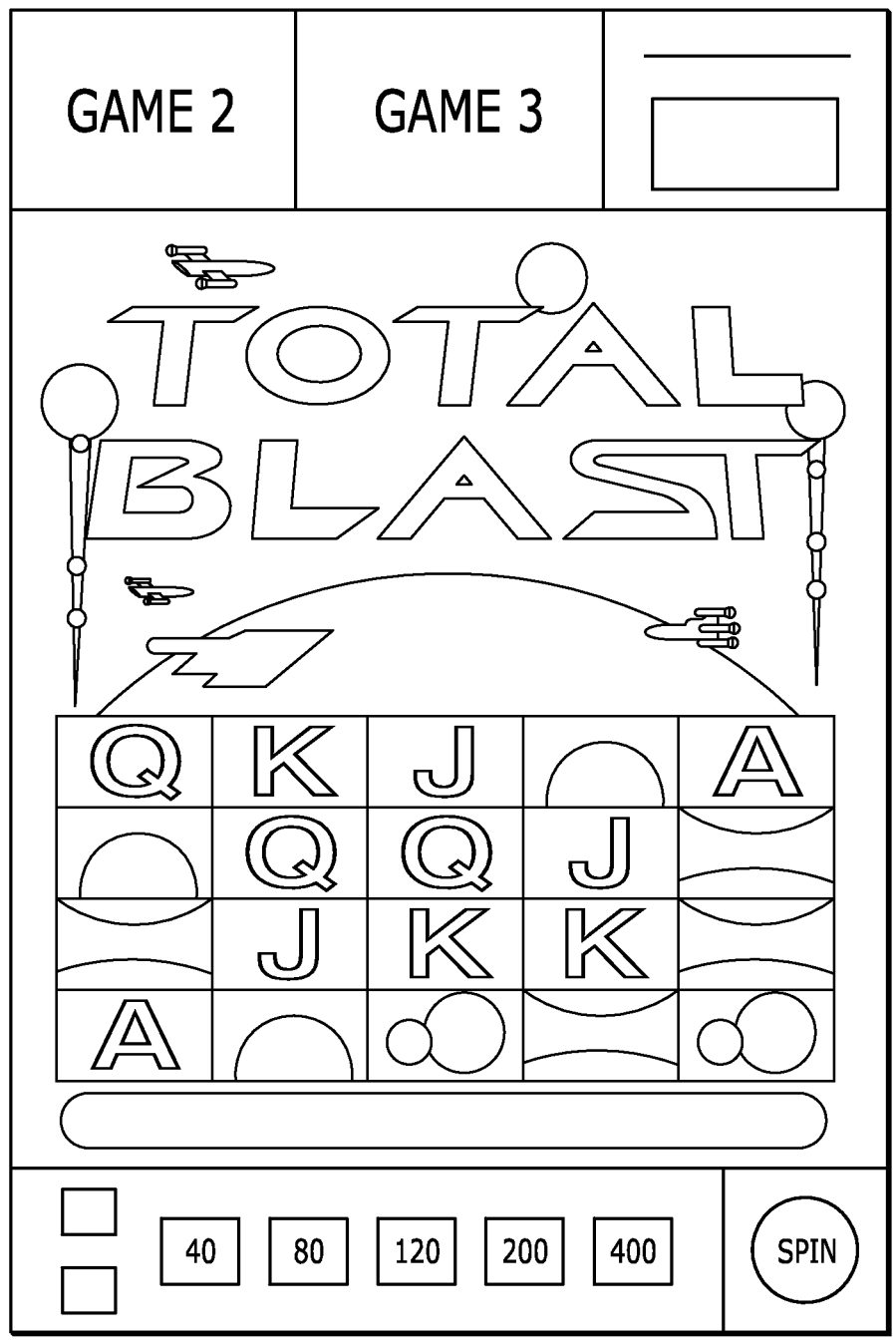
FIG. 7 illustrates an exemplary user interface for Take 'n Play table screen, according to one embodiment.

The present gaming interface provides a concurrent game feature in a remote gaming mode herein referred to as "Take 'n Play." FIG. 7 illustrates an exemplary user interface for Take 'n Play table screen, according to one embodiment. The Take 'n Play table screen may be too small to accommodate all the games. In this case, the EGM streams one game at a given time and shows the other games as minimized. A player can review other games by touching on the minimized button. A touch event by the player is communicated to the EGM, and the EGM changes to stream the game selected by the player in the following sequence.

1. The player is playing concurrent games 1, 2, 3, and 4;
2. The player switches over to Take 'n Play;
3. The EGM streams game 1 and other games 2, 3, and 4 are minimized;
4. The player sees game 1 on table screen fully and other games are minimized;
5. If the player touches game 2 button on the Take 'n Play screen, the EGM gets notified; and
6. The EGM streams game 2 and minimizes game 1.

Figure 8A:
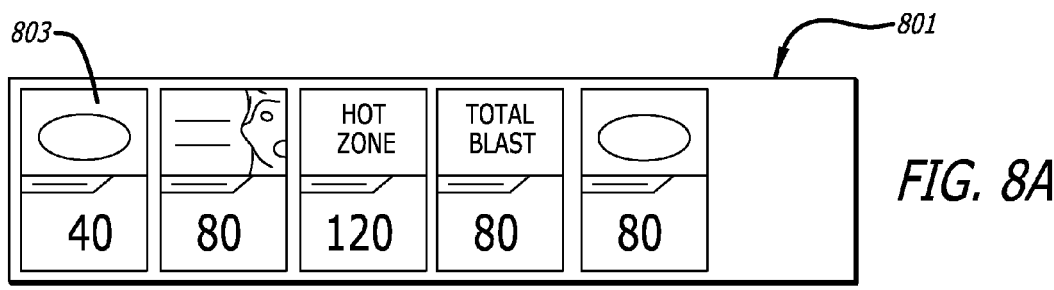
FIGS. 8A-8D illustrate a process for changing a betting amount from an iDeck in accordance with some embodiments.
Figure 8B:
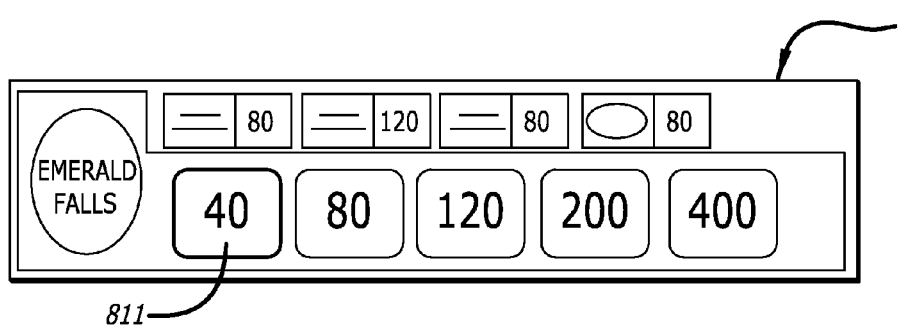
Figure 8C:
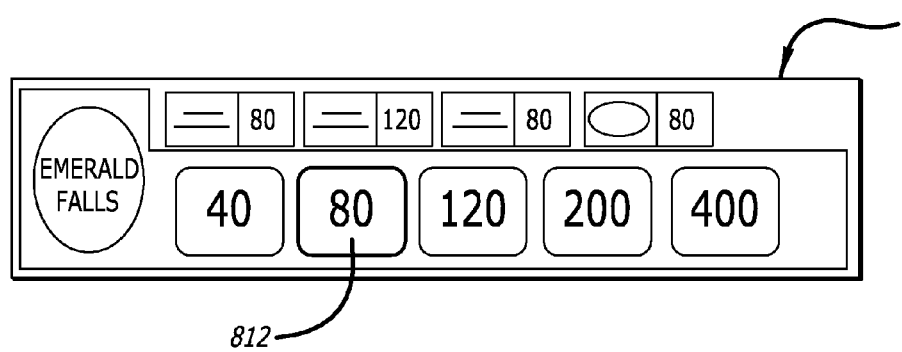
Figure 8D:
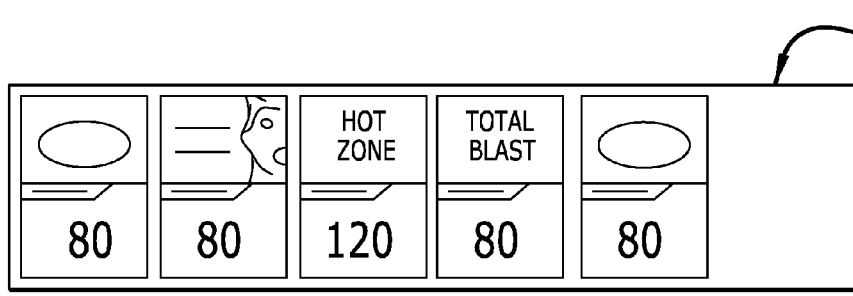

FIGS. 8A-8D illustrate a process for changing a betting amount from an iDeck in accordance with some embodiments. The game tiles in the iDeck 800 shows five games. The player clicks on a lower half of a game tile 803 to display a wager denominations 40, 80, 120, 200, and 400 as shown in FIG. 8B. The current denomination 40 (811) is highlighted to indicate the current better wager. The player selects the better wager to 80 (812) as indicated in FIG. 8C, and the better wager is changed to 80 as shown in FIG. 8D.

Figure 9:
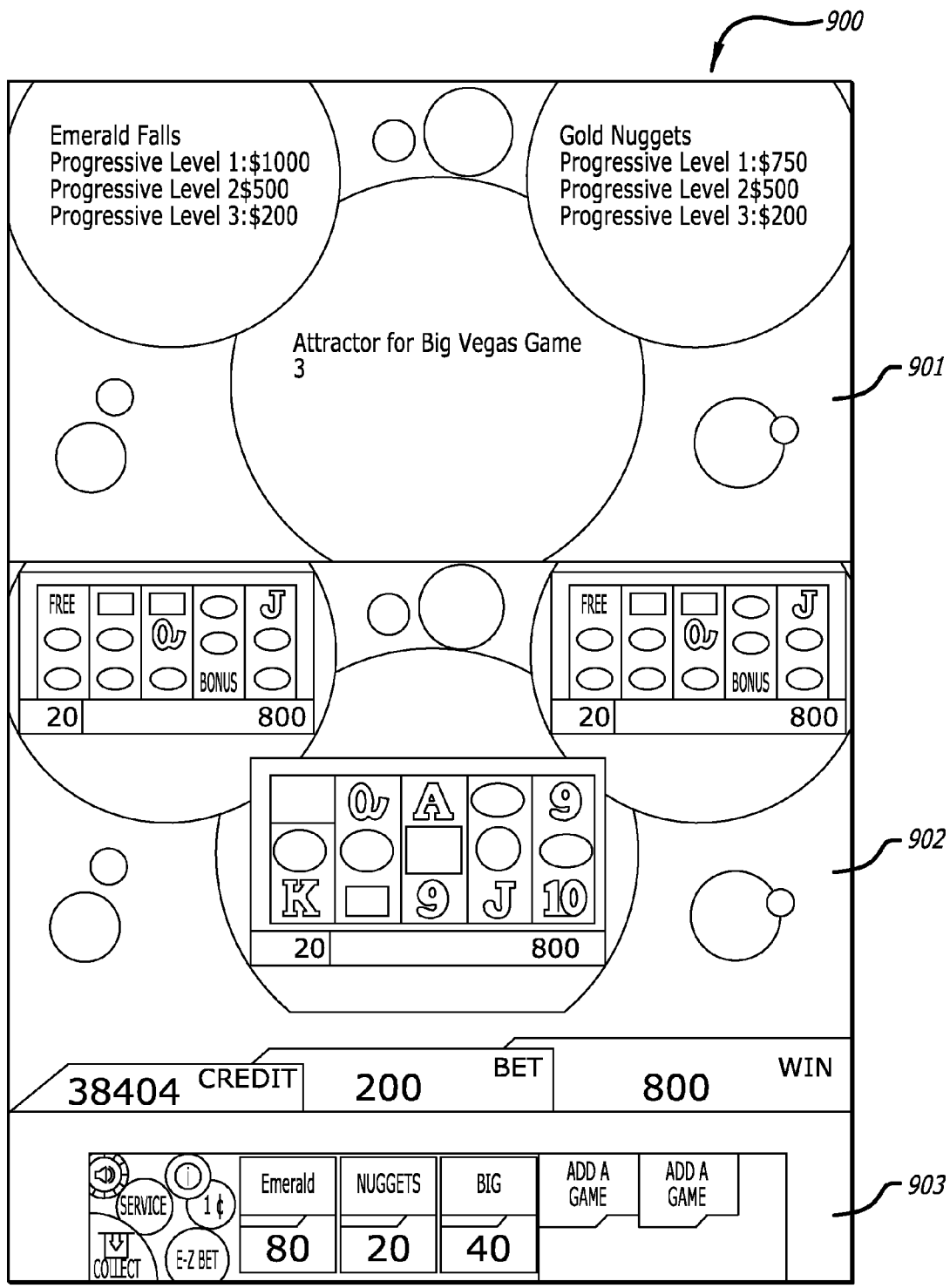
FIG. 9 illustrates an exemplary user interface for displaying progressive amounts in accordance with some embodiments.

FIG. 9 illustrates an exemplary user interface for displaying progressive amounts in accordance with some embodiments. The gaming interface 900 includes three sections including a top display 901, a main display 902, and an iDeck 903. In an attract mode, the game bubbles representing available games float upward onto the top display 901 and disappears off the top display 901. The default game bubble remains in the left most position in the main display 902. The background access bubbles continue to float upward from the main display 902 to the top display 901.

In a game play mode, the top display 901 displays floating bubbles of the game titles selected by the player. These game bubbles are displayed one at a time using the maximum display space for best graphical representation. Game bubbles enter from the left side center and pause to show the game title. After 5 seconds, the game bubbles rotate (3D spherical rotation) to show the game reels or bonus game animation spin sequence. After another 5 seconds, the next game title bubble enters from the left and nudge (push) the current bubble off the right side of the top display 901. The bubbles repeat the rotation sequence until the gaming interface changes to a game play mode. If only one title is selected, the single game title/reel animation bubble is the only one displayed and remained in the center of the top display 901 after entering from the left initially.

When there is no progressive game being played, the top display 901 displays an attractor screen including game bubbles. A progressive game may be shown in the top display 901 in various ways. For example,

- a bubble with the progressive game theme is displayed on the top monitor; the bubble theme matches the game theme on the primary screen;
- Progressive amount bubble is of the same size as the progressive game in the primary screen;
- Progressive amount bubble is of the same position as the progressive game in the primary screen;
- Progressive amount bubble displays the progressive level and the progressive amount; and
- The size and position of the progressive game amount bubble in the secondary screen reflect the corresponding one in the primary screen during animation.

The gaming interface 900 displays three games, Game 1 (Emerald Falls), Game 2 (Gold Nuggets), and Game 3 (Attractor for Big Vegas) that are concurrently being played. Game 1 and Game 2 are progressive games while Game 3 is not a progressive game. The three game bubbles with the same size and position as in primary screen are displayed in the top monitor. Game 1 and Game 2 display their respective progressive level and amount. Since Game 3 is not a progressive game, Game 3 displays an attractor video.

A game bubble vibrates when the player touches the main display over a predetermined time. When a game bubble starts to vibrate, several game options for the selected game are provided to the player to act on, for example, close, minimize, or maximize. The player may choose to keep a game but not play it for some time. In this case, the game is essentially paused for an indefinite period of time. The present gaming interface provides a facility to allow the player to pause or minimize the game and play other games. The remaining games are adjusted to their maximum allowed space. The player can resume the paused/minimized game play by maximizing the game. This pause/minimize feature of the present gaming interface enables a player to select more games than the number of games that the game screen can accommodate. For example, if the screen can accommodate only four games, the player could choose eight games from the gaming interface but play only four games concurrently rendering the non-selected four games remain in paused state. The pause/minimize feature is available for multiple gaming interfaces as shown in FIGS. 12-16.

According to one embodiment, the present game user interface provides a credit bubble. The game screen has one or more non-credit bubbles floating in the background of the game screen. Occasionally, some of these non-credit bubbles turn into credit bubbles. The player clicks on a credit bubble floating in the background to obtain a credit amount that corresponds to the credit bubble. A credit bubble appears in various events, but not limited to:

- When a player coin-in exceeds a configured number, the credit bubble feature is triggered. Some of the non-credit bubbles turn into credit bubbles by showing a special graphical image (e.g., star, emerald) inside the bubbles. The player gets credits depending on the type and the number of credit bubbles he breaks.
- A credit bubble is used to attract a player to a game. When no one is playing, the game displays credit bubbles floating in the screen. A message "Break bubbles and win free credits to play the game" (i.e., attractor) is shown on the game screen to entice a player to the game.
- As a player plays longer, the number of credit bubbles is increased, making the player stay longer and collect more credits.
- Special bubbles have a different value depending on the color and/or graphical image shown in the bubble.

A play mode is entered when a player touches a "Play Now" button or hits a spin button in an attract mode or a wheel mode. Entering a play mode requires sufficient credits on the gaming machine to wager on the selected game(s). In the game mode, each game instance is represented with a translucent game bubble. The game bubble has a 3D sphere appearance and a color that represents the game instance. The background graphic art will wrap the game bubble to the edge. The size of a game bubble scales to provide a proper visual presentation for the selected number of games. Each game instance has a game bet meter and a win meter displayed below the game reel in the game bubble.

A line wins of a game instance is treated as a normal game. A line win is evaluated as a game reel stops and credit rolls up in a total credit roll-up at the bottom of the screen. A large line win (e.g., 200 credits and over) is treated as a big win. The game instance of a big win grows in size to emphasize the big win. When a big win occurs, the game instance enlarges its game bubble smoothly and nudges adjacent game bubbles out of the way during the course of the credit roll-up. At the conclusion of the credit roll-up, the enlarged game instance shrinks back to its original size, and the adjacent game bubbles back to their original positions.

According to some embodiments, the total credit roll-up at the bottom of the screen rolls up in a cascading fashion. Simultaneously with game line wins, the credits will also increment the master win meter at the bottom of the screen.

In the event of a slot game hitting a bonus, all other games complete their base game reel spins prior to the execution of the bonus game event. The bonus game may be shown in a full screen mode. The cascade reel spins and complete, the game that hits the bonus displays a bonus message and other graphical emphasis. In the event of more than one bonus events, the bonus games are played in sequence one at a time. Games that are not eligible for a bonus are grayed out indicating to the player that the games are not available for play until the bonus games are complete. At the conclusion of the base game spins and credit roll-ups, a pause of 3-5 seconds is given to the player to see the games that have pending bonuses prior to expanding the pending bonus games. Game bubble expansion to and from the full screen mode is in a smooth transition over 1-2 seconds, emphasizing the expansion and reduction of the bonus event. According to some embodiments, the player can choose a bonus to play out of multiple bonuses given at a time. Upon execution of a bonus game, the corresponding game enlarges to a full screen mode pushing other game bubbles off the screen. The bonus game is played and upon completion, the game shrinks to its original size and other game bubbles return to their original position.

During a game play, the main display's touch screen is the main interface allows a player to access to the game selection wheel, view game see pays, add and delete games. The player touches a game of interest, and the game flips. The associated game tile in the iDeck is illuminated, highlighted, or differentiated graphically from other game tiles to indicate that the game slot is changed. According to one embodiment, a game bubble randomly shows a graphic that depicts flipping the game bubble for options. An icon and text representing the flip action for "More Options" is incorporated into the game bubble.

Figure 10:
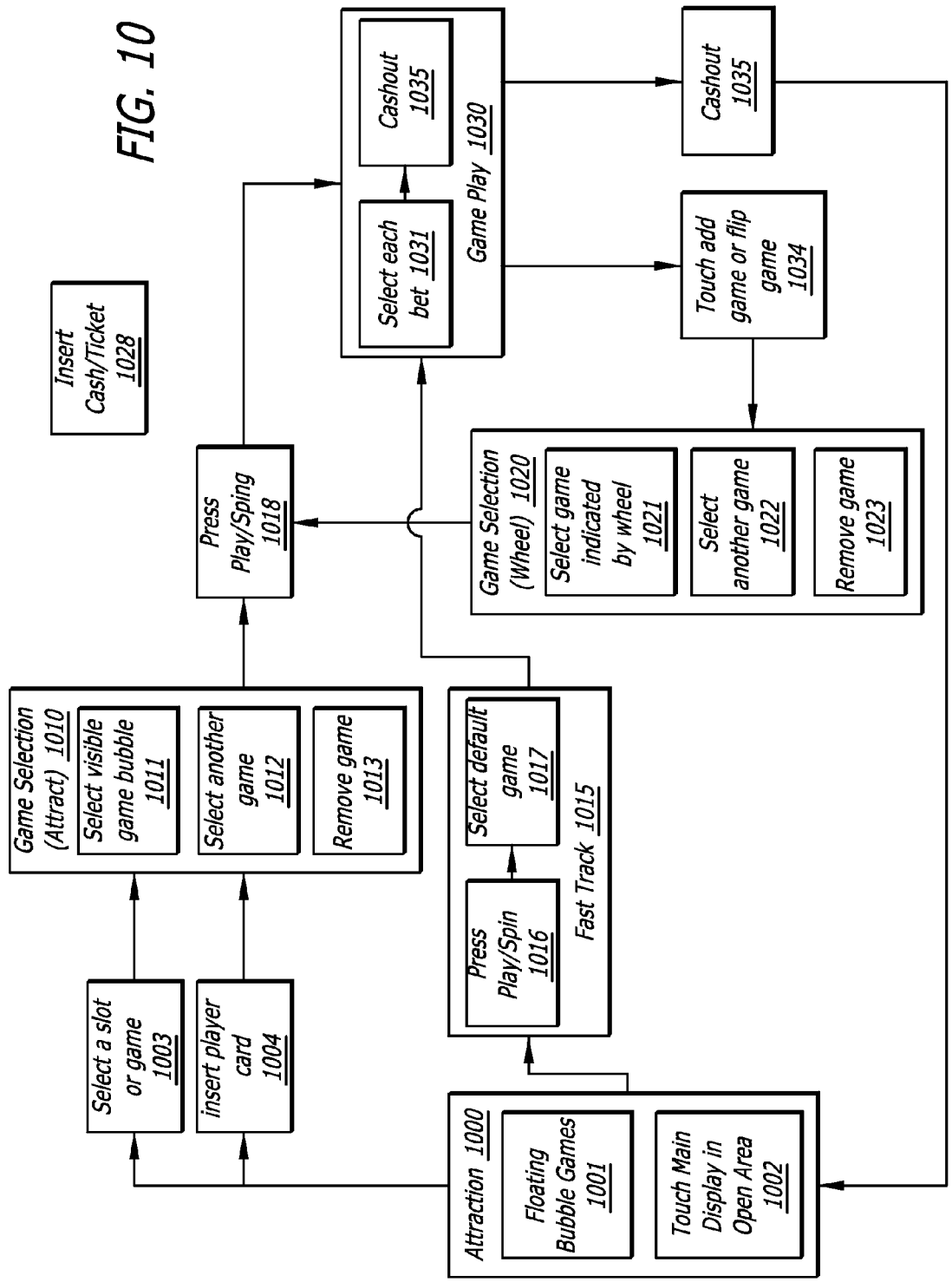
FIG. 10 illustrates a flow diagram for displaying a gaming interface, in accordance with one or more embodiments.

FIG. 10 illustrates a flow diagram for displaying a gaming interface, in accordance with one or more embodiments. The flow diagram includes various modes of the gaming machine of FIG. 1, including, game attraction mode 1000, game selection mode by attraction 1010, game selection mode in wheel 1020, and game play mode 1030. In game attraction 1000, game bubbles are floating in the main display (1001). Each of the game bubbles includes a top display such as a revolving game and a simulated play of the game. When a player touches the main display in an open area, the game attraction mode 1000 modifies, and bubble games wiggle, shake, or changes a display in an interactive fashion response to the player's selection, or a new game bubble may appear. The player selects a slot or a poker game (1003) from the main display, and the display of the gaming machine changes the displayed games to the slot or game that the player selected. The player may insert a player card anytime to populate the player's favorites or recently played games in bubbles (1004). The insertion of the player card or log on from a player account allows the game selection wheel to populate with favorites, recently played, suggested game you may like and other direct targeted offers based on the player's profile.

Once the player selects a slot or game to play from the main display, the gaming interface of the gaming machines displays a game selection mode by attraction 1010. The player can select any visible game bubble by moving gaming icon to iDeck (1011), select another game from visible bubbles (1012), or remove a game (1013) by touching iDeck tab to show a remove option. The player presses a play/spin button on the display (1018) to load and start a game (1018) in the game play mode 1030. In the game play mode 1030, the player selects a bet for the game. For concurrent games, the individual bets appear on iDeck, and total amount of bets is shown on the screen (1031). The player presses the play/spin button to apply the wager (1032). During the game play mode 1030, the player may touch a "add game" button from the iDeck or flip a game by touching a "more games" button from the main display (1034) and the game machine changes to the game selection mode by wheel (1020). The game selection mode by wheel 1020 is similar to the game selection mode by attract 1010 except that the game selection is made by wheel. For example, the select game indicated by wheel (1010) moves the game icon to iDeck. Similarly, the select another game 1022 from wheel options or surprise me pick, or remove game 1023 by touching iDeck tab to show the "remove" button. The player may cash-out (1035) at any time from the game play mode 1030, and the game machine returns to the game attraction mode 1000. The player may insert cash or ticket in any mode during the play (828).

Figure 11:
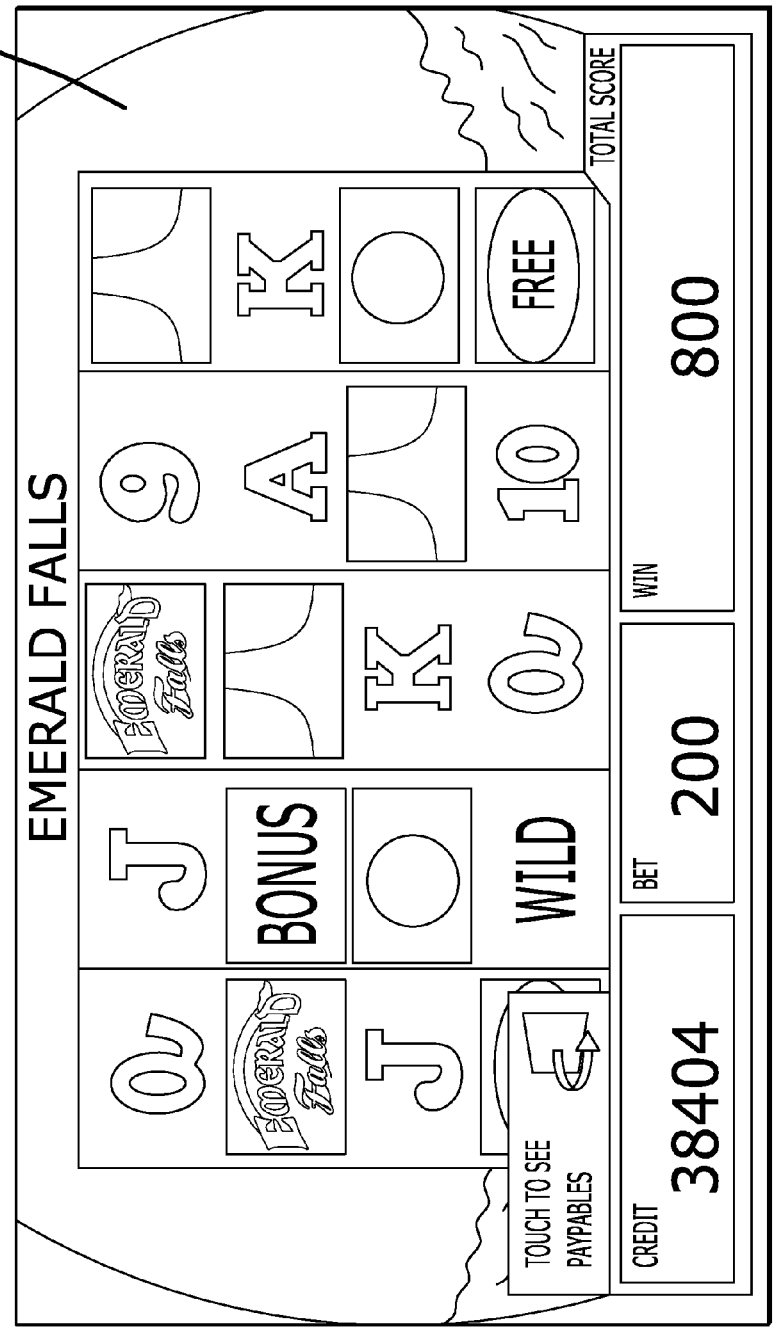
FIG. 11 illustrates a user interface for a single game view, according to one embodiment.
Figure 11:
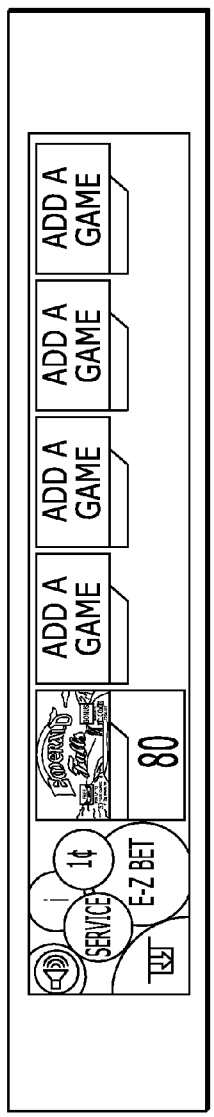

FIG. 11 illustrates a user interface for a single game view, according to one embodiment. The slot game 1103 is displayed in a game bubble. While the player plays the game, the game bubble 1101 may move slightly or stays static with small bubbles floating in the background. Some of the small background bubbles may show a message, a promotion, or a bonus credit, an offer, or an entertaining effect. The slot game has a credit window 1101, a bet meter 1102, and a win meter 1103. The top screen shows animation while the game is played. The ProView Win area may enlarge and/or animate in the event of a big win. In a single game mode, only the master meters (e.g., credit meter, bet meter, and win meter) are displayed. The iDeck shows only the selected game in the first game tile. The bet amount selected on the iDeck is reflected on the master meter bet display.

Figure 12:
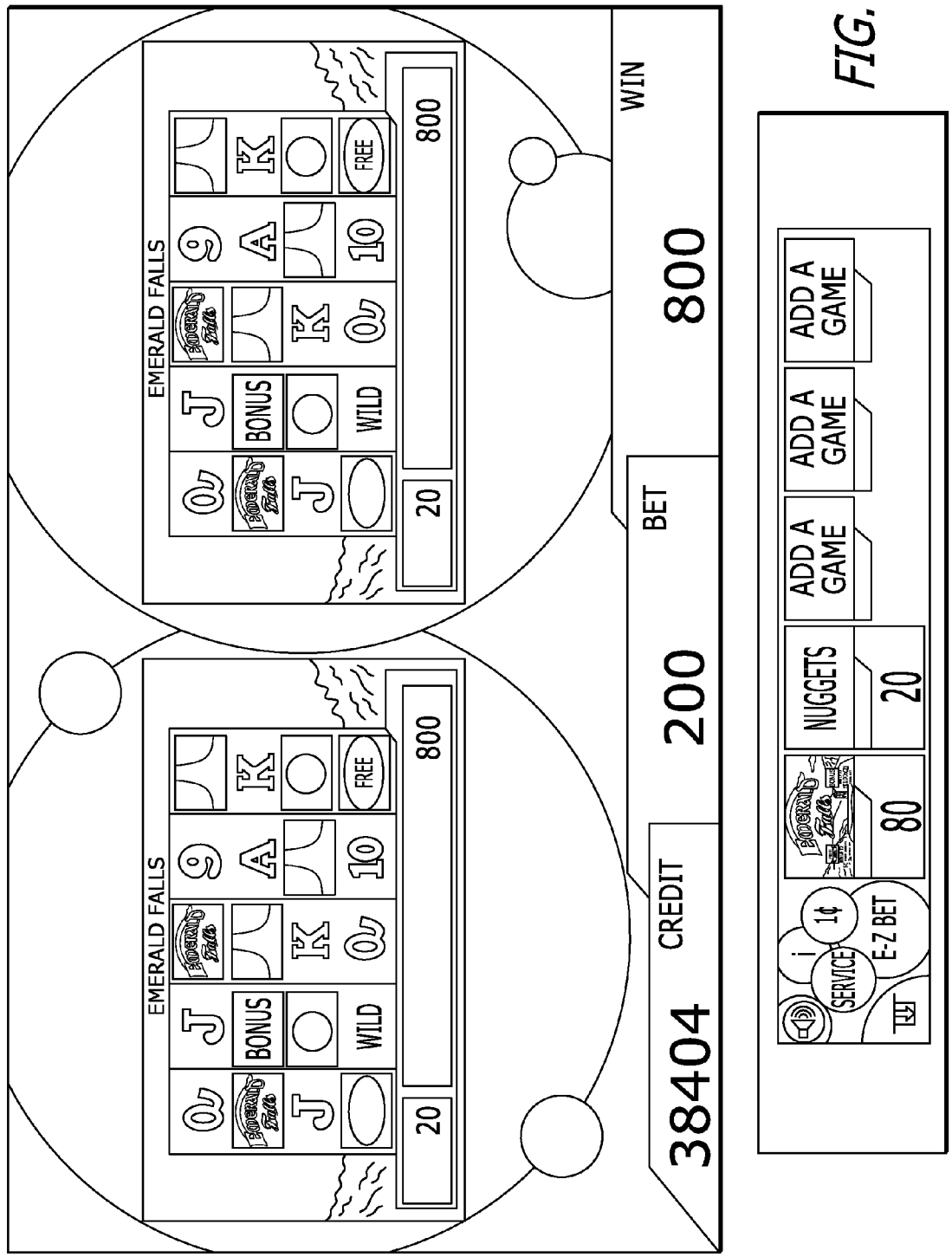
FIG. 12 illustrates a user interface for a double game view, according to one embodiment.

FIG. 12 illustrates a user interface for a double game view, according to one embodiment. The double game view concurrently displays two game bubbles. In each of the game bubbles, the game play is displayed and updated as the game progresses. Small bubbles float in the background, displaying a message, a promotion, and a bonus credit. A credit window 1201, a bet meter 1202, and a win meter 1203 shows the game display corresponding to the selected game from the two games shown in the main screen. The iDeck shows the two game tiles shown in the main screen of the double game view. The player may move the bet meter and the win meter to the lower area of the game bubble to display more reel space.

Figure 13:
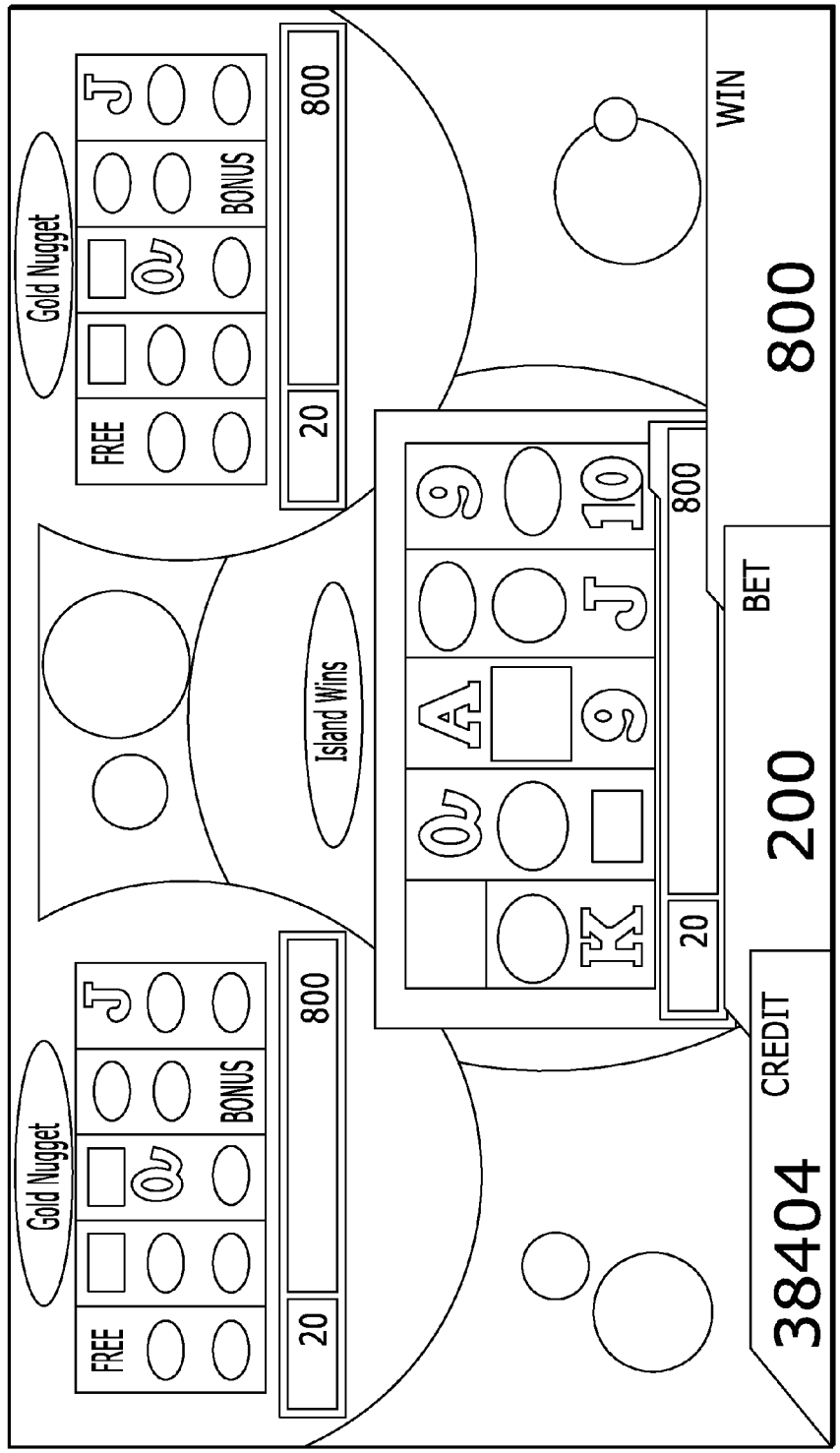
FIG. 13 illustrates a user interface for a triple game view, according to one embodiment.
Figure 13:
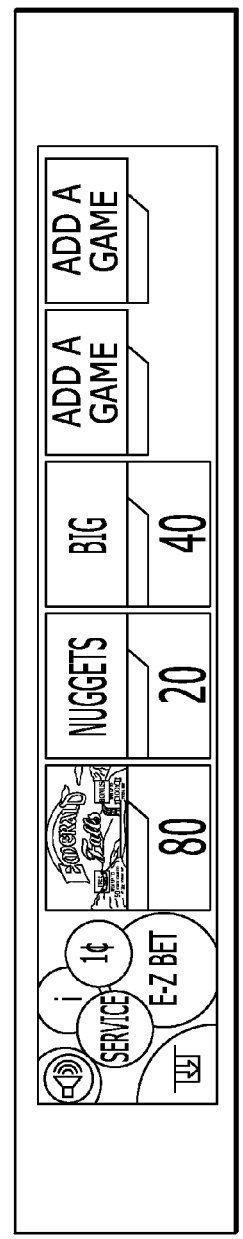

FIG. 13 illustrates a user interface for a triple game view, according to one embodiment. The triple game view concurrently displays three game bubbles. The bubble areas 1301, 1302, and 1303 above the game reel are used to display the title of the respective game. Small bubbles float in the background, displaying a message, a promotion, and a bonus credit. The iDeck shows the three game tiles shown in the main screen of the triple game view. It is understood that the layout of the game bubbles may change depending on the user's configuration, the game bubbles displayed, and/or the location of an active game, and the like, in other embodiments.

Figure 14:
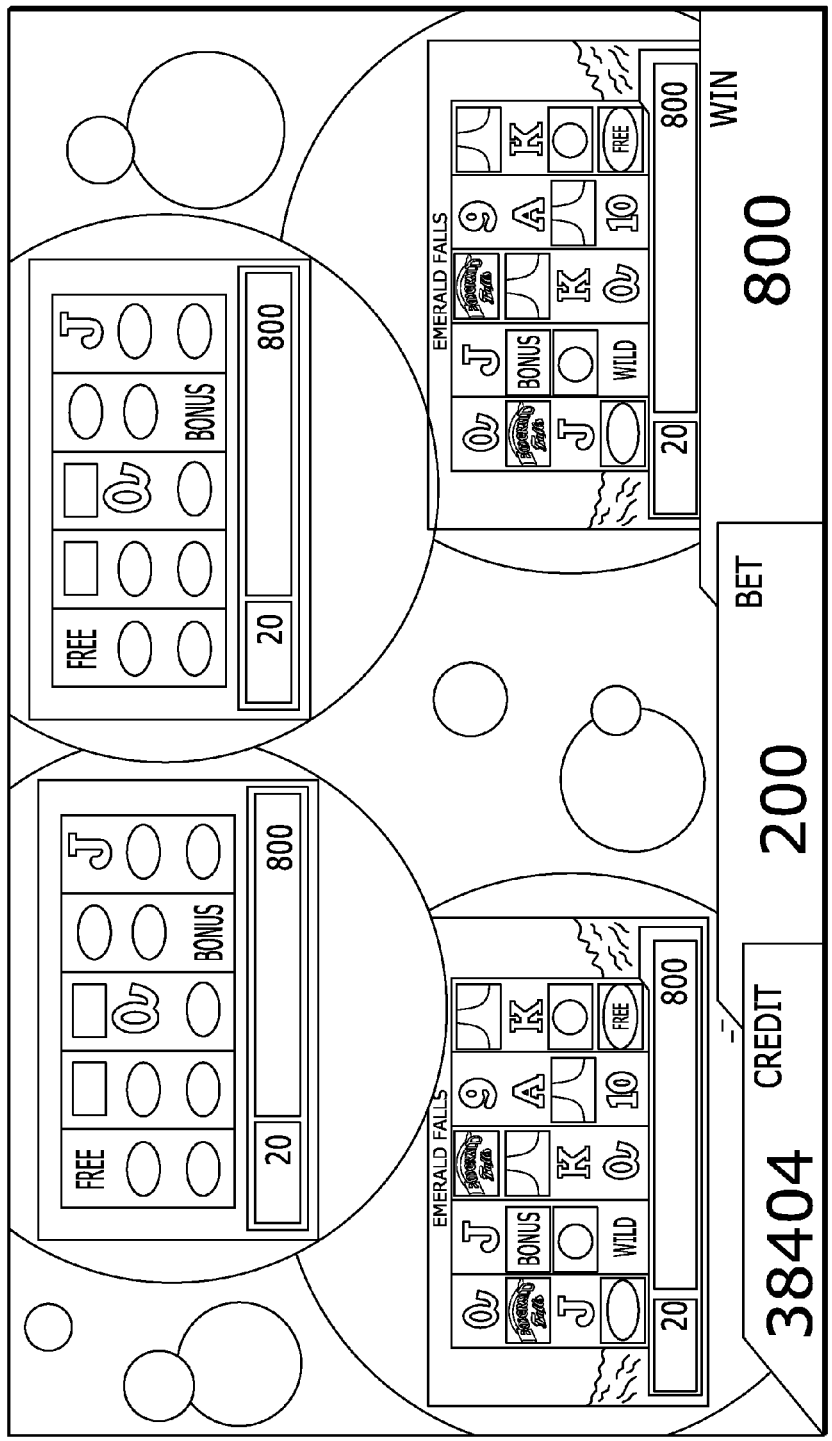
FIG. 14 illustrates a user interface for a quadruple game view, according to one embodiment.
Figure 14:
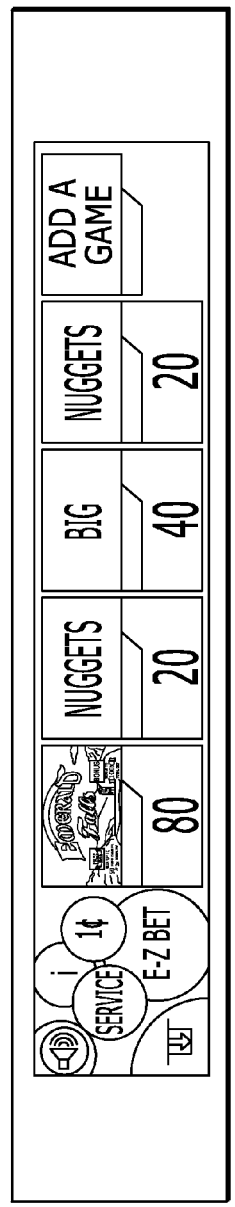

FIG. 14 illustrates a user interface for a quadruple game view, according to one embodiment. The quadruple game view concurrently displays four game bubbles. Similarly to the single, double, and triple game views, small bubbles float in the background, displaying a message, a promotion, and a bonus credit. The iDeck shows the four game tiles shown in the main screen of the quadruple game view.

Figure 15:
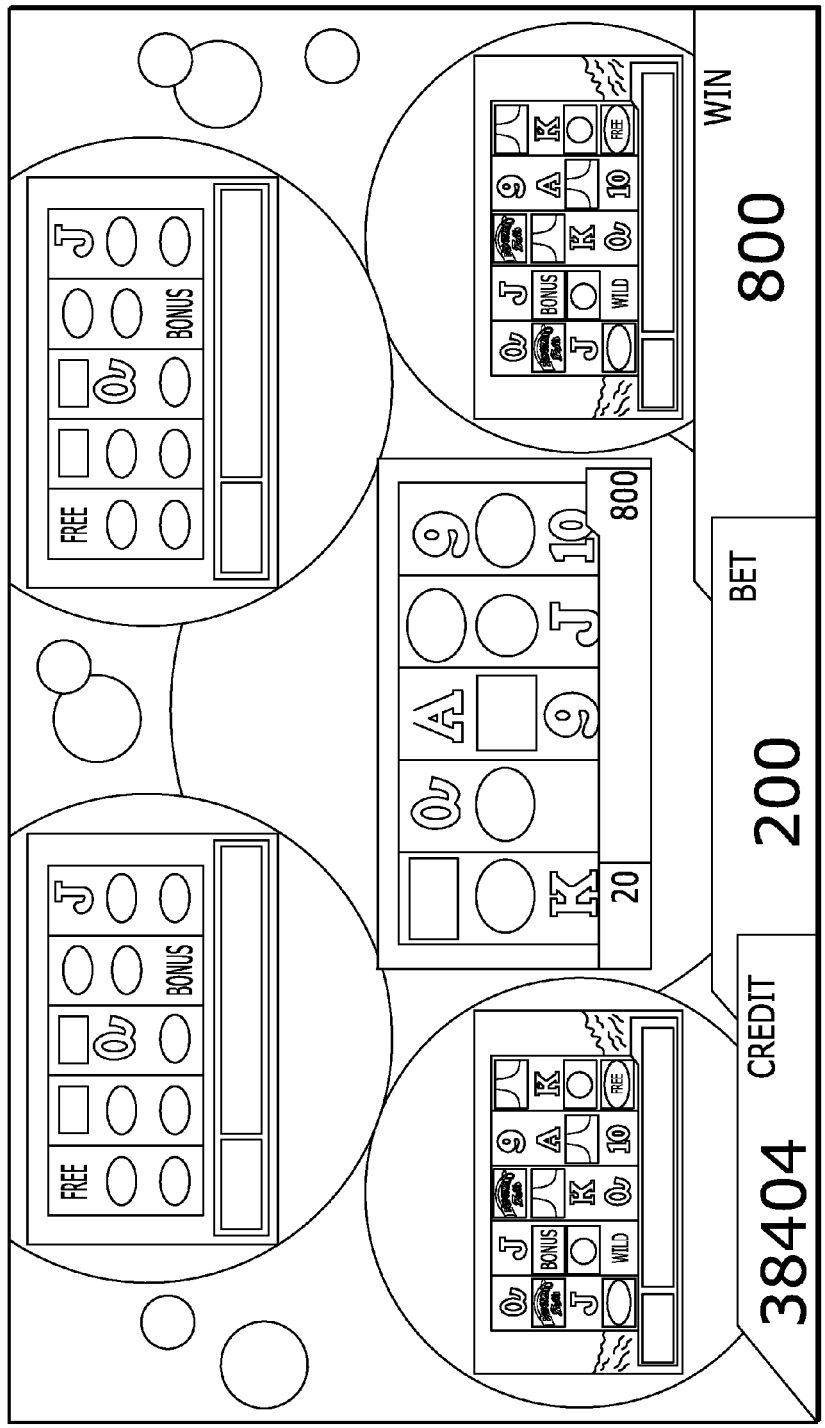
FIG. 15 illustrates a user interface for a quintuple game view, according to one embodiment.
Figure 15:
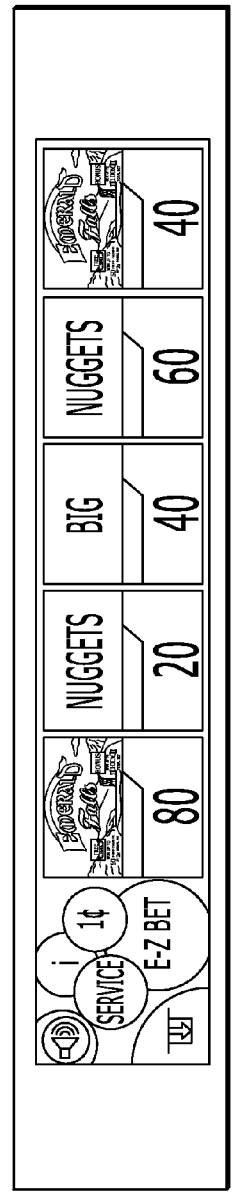

FIG. 15 illustrates a user interface for a quintuple game view, according to one embodiment. The quintuple game view concurrently displays five game bubbles. Similarly to the single, double, triple, and quadruple game views, small bubbles float in the background, displaying a message, a promotion, and a bonus credit. The iDeck shows the five game tiles shown in the main screen of the quintuple game view. The player touches a game tile in the iDeck, and several options are displayed, including, but not limited to, "Remove Game," and "More Games."

Figure 16:
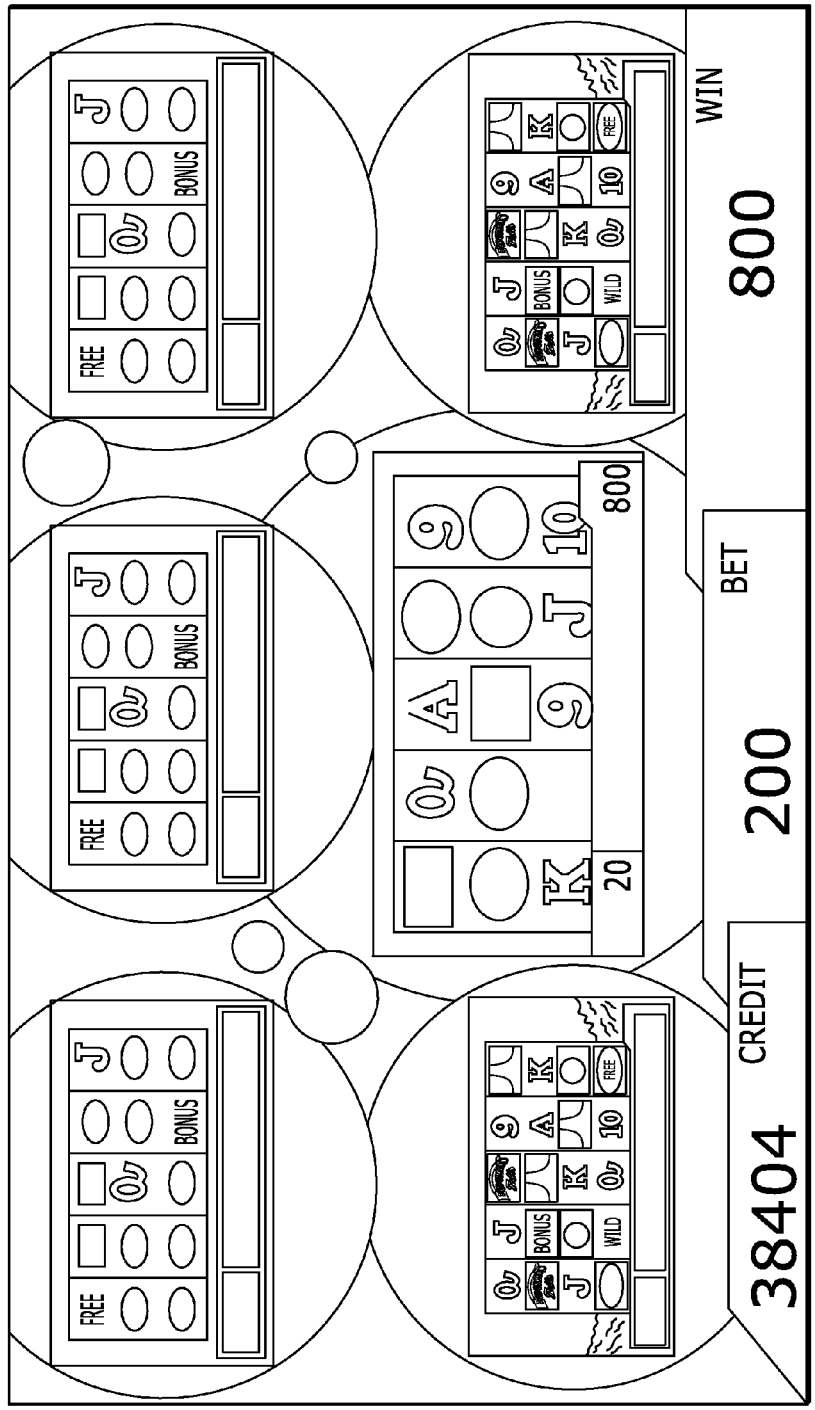
FIG. 16 illustrates a user interface for a sextuple game view, according to some embodiments.
Figure 16:
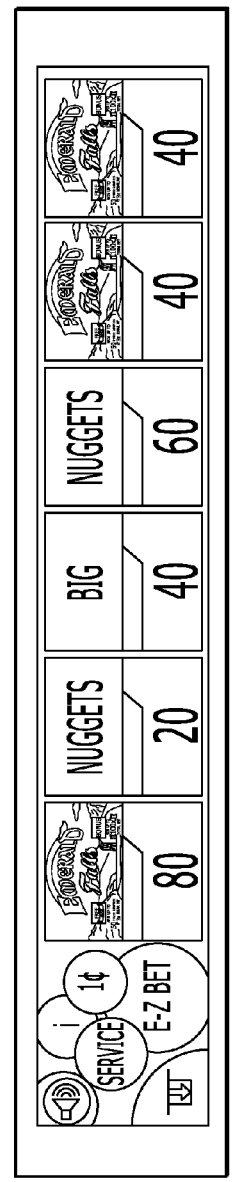

FIG. 16 illustrates a user interface for a sextuple game view, according to some embodiments. The sextuple game view concurrently displays six game bubbles. The game tile area in the iDeck expands to accommodate the game tile of the sixth game tile.

Figure 17:
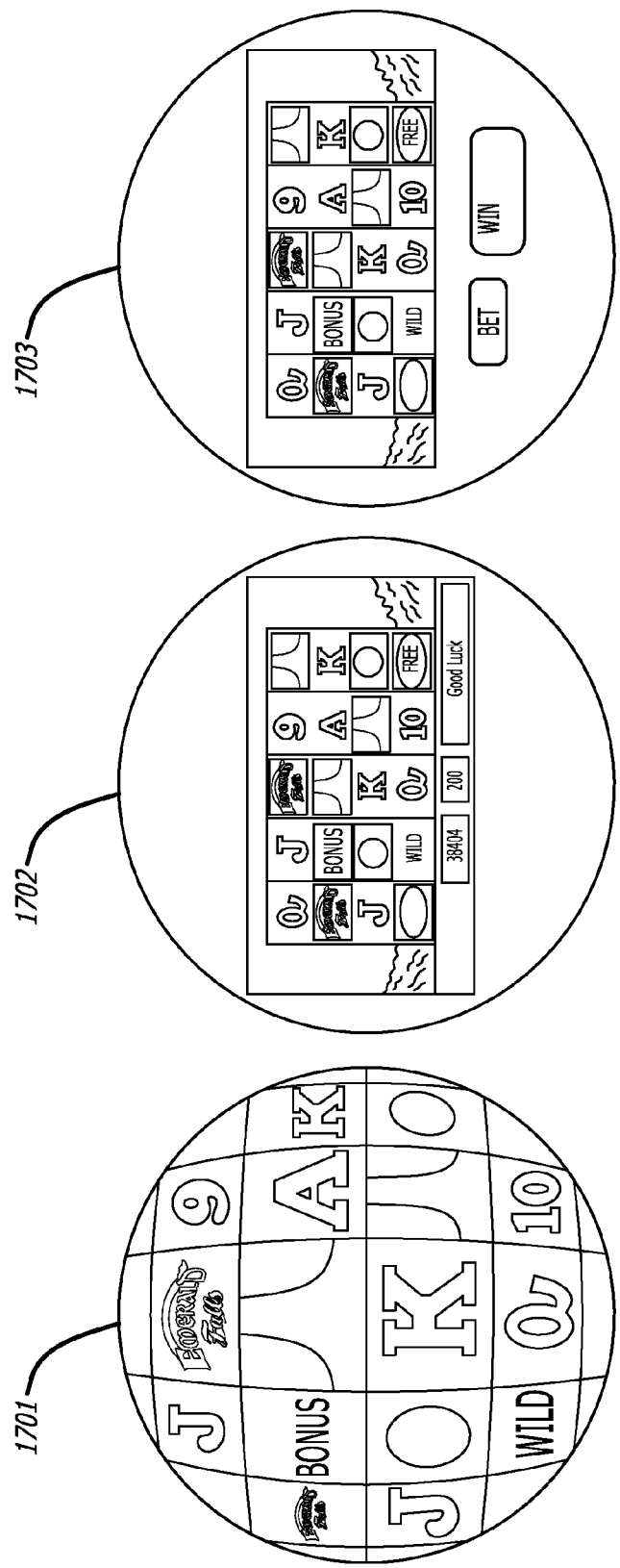
FIG. 17 illustrates various effects on game bubbles.

FIG. 17 illustrates various effects on game bubbles. The visual effects on a game bubble may play anytime during the play of a game, for example, when a player clicks on a game bubble, or an event occurs during a play. In one embodiment, the bubble camera angle changes to provide a wrap around effect as indicated in the game bubble 1701. In another example, the game background art wraps around the game bubble. The game background might be transparent and provides three-dimensional (3D) wrap around the bubble surface. When a game is between "spins" or idle, the game bubble rotates around and shows the back side of the reel, a teaser of the bonus game, or other animation or visual effects. The bet meter and the win meter may be integrated in the game reel (e.g., game bubble 1702) or separately located below the reel (e.g., game bubble 1703) within each game bubble depending on the player's configuration or a default game configuration.

Figure 18:
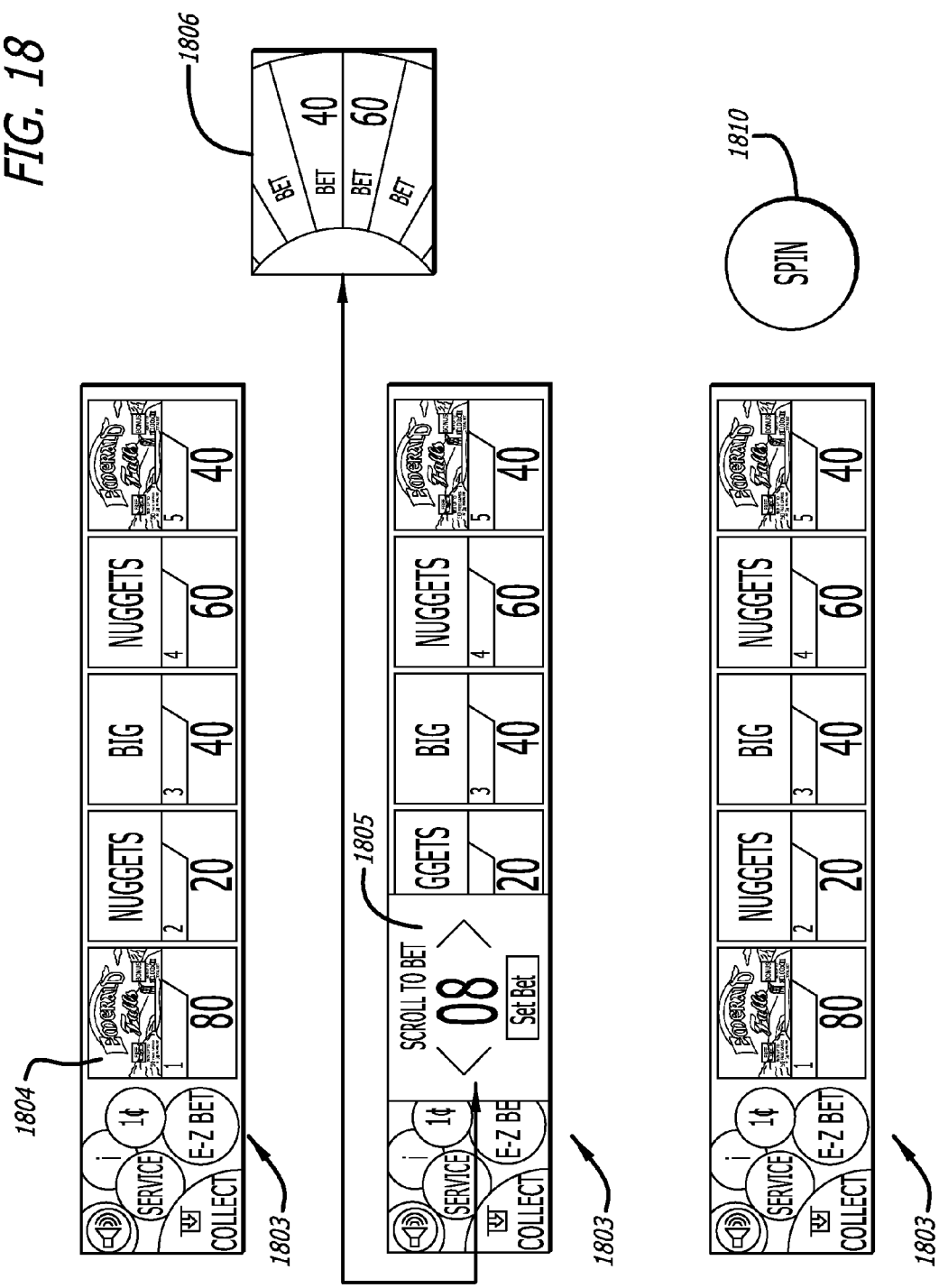
FIG. 18 illustrates an exemplary iDeck screen, according to some embodiments.

FIG. 18 illustrates an exemplary iDeck screen, according to some embodiments. The iDeck screen is used for wagering and denomination for concurrent games. The player can select a wager in the iDeck. The game icon flips over in response to the player's input of a wager. Referring to FIG. 18, the EZ-bet icon is used to activate EZ-bet. The active game tile 1804 flips when the EZ-bet option is selected.

The EZ-bet option displays a scroll-through betting option over the active game tile 1804. On the scroll-through betting option, a wheel style selection 1806 and a "Set Bet" button 1805 are displayed. The "Set Bet" button is used to activate the Set Bet option. The player selects "Done" button (not shown), and the new wager is displayed on the active game tile. The player plays the active game by touching the "Spin" button 1810 or a mechanical button on the gaming machine.

Figure 19:
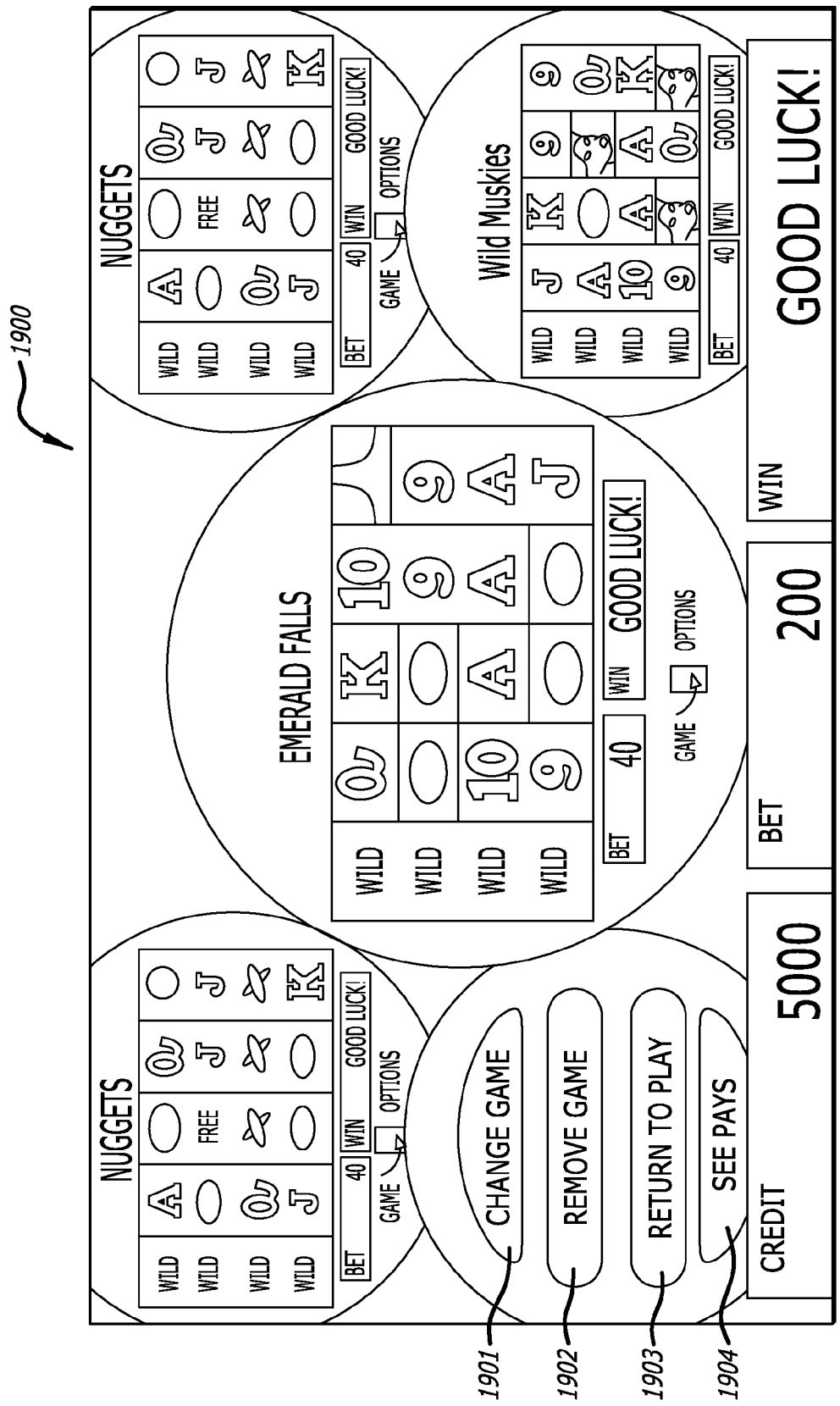
FIG. 19 illustrates a play mode of an exemplary gaming interface including options of a game instance in accordance with one or more embodiments.

FIG. 19 illustrates a play mode of an exemplary gaming interface including options of a game instance in accordance with one or more embodiments. The present gaming system provides a three-dimensional (3D) flip of a game screen. A player can flip a screen of a game using a 3D flip feature 1900. When the game screen is flipped using the 3D flip feature 1900, one or more option buttons (e.g., Change Game 1901, Remove Game 1902, Return to Game 1903, and See Pays 1904) are displayed on a user interface. The "Change Game" 1901 brings up the game selection wheel. The associated game tile on the iDeck is illuminated, highlighted, or differentiated graphically from other game tiles to indicate that the game slot is changed. The player has an option to change the game via a game selection wheel by touching the "Play Now" button to return to a game play. The "Remove Game" 1902 removes the game instance and causes the remaining game instances to resize and realign on the main display. If there is only one game instance, and the game instance is removed, the game selection wheel appears on the main display. The "Return to Game" option 1903 makes the game window to flip back in a 3D fashion (e.g., rotating in a 3D space) to resume the game. The "See Pays" 1904 is used to show the game rules for the selected game. The "See Pays" screen has an exit back to a game button to take the player back to the active game play mode. The "See Pays" for the selected game animates as a bubble from the bottom of the main display. The selected game bubble may be visible through the "See Pays" bubble. While the game options menu is flipped, wager changes and spins are disabled. The player must return to the game play mode for wagers and spins to become active.

Figure 20A:
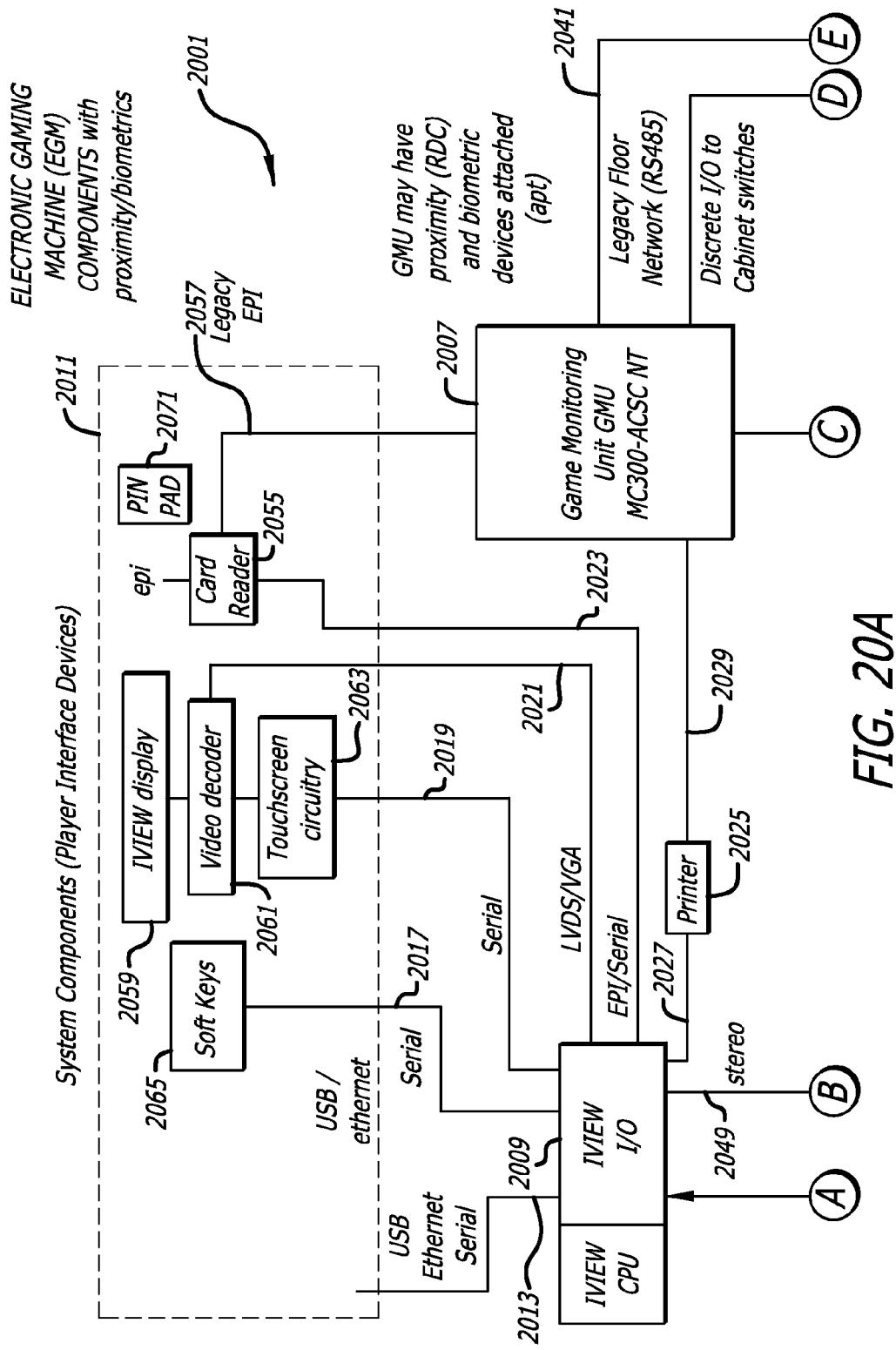
FIG. 20A illustrates a block diagram of the physical and logical components of the gaming machine of FIG. 1 in accordance with one or more embodiments.
Figure 20B:
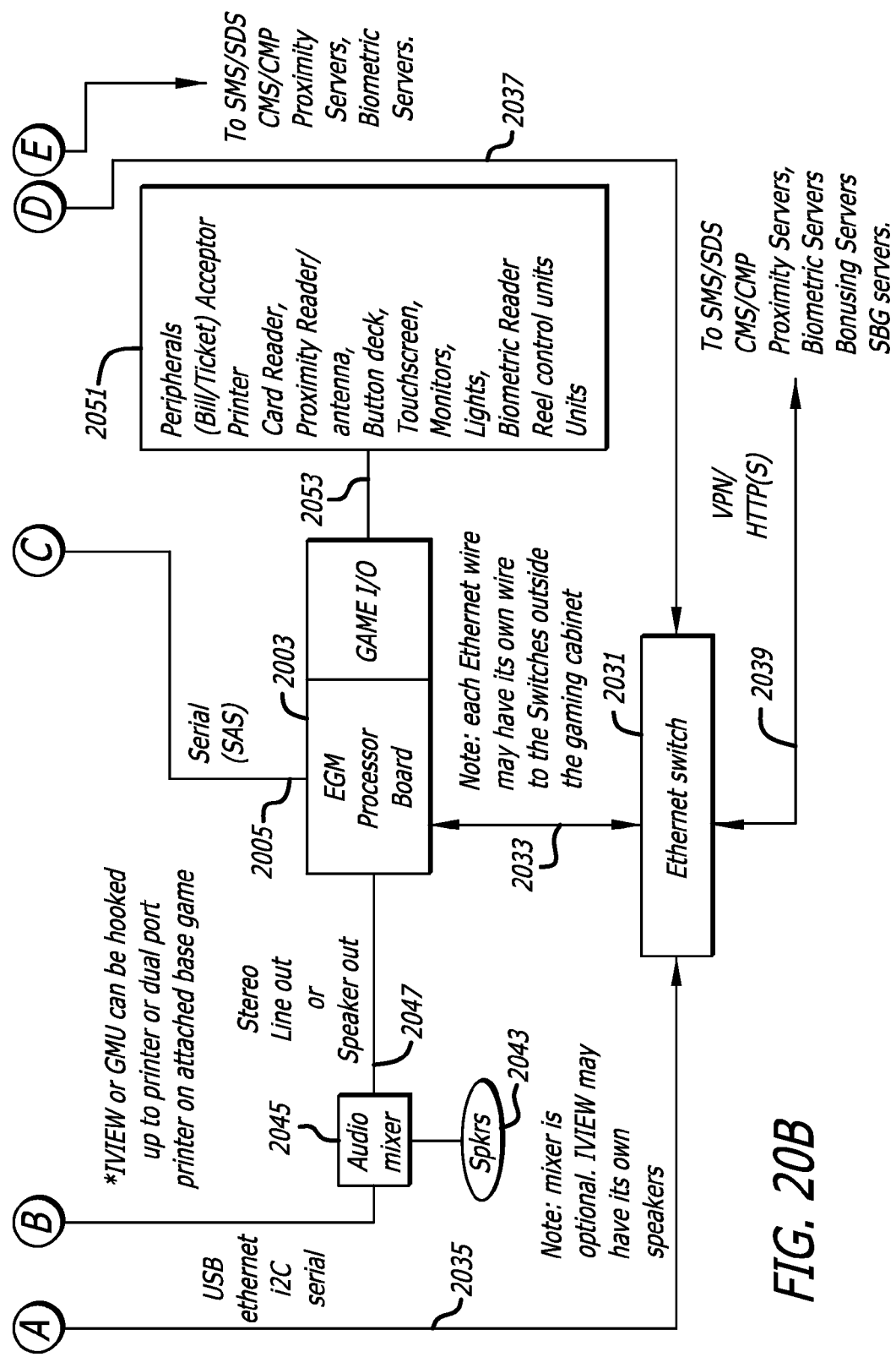
FIG. 20B illustrates a block diagram of the physical and logical components of the gaming machine of FIG. 1 in accordance with one or more embodiments.

Referring to FIGS. 20A and 20B, electronic gaming machine 2001 is shown in accordance with one or more embodiments. Electronic gaming machine 2001 includes base game integrated circuit board 2003 (EGM Processor Board) connected through serial bus line 2005 to game monitoring unit (GMU) 2007 (such as a Bally MC300 or ACSC NT), and player interface integrated circuit board (PIB) 2009 connected to player interface devices 2011 over bus lines 2013, 2015, 2017, 2019, 2021, 2023. Printer 2025 is connected to PIB 2009 and GMU 2007 over bus lines 2027, 2029. Base game integrated circuit board 2003, PIB 2009, and GMU 2007 connect to Ethernet switch 2031 over bus lines 2033, 2035, 2037. Ethernet switch 2031 connects to a slot management system (SMS) and a casino management system (CMS) network over bus line 2039. GMU 2007 also may connect to the SMS and CMS network over bus line 2041. Speakers 2043 connect through audio mixer 2045 and bus lines 2047, 2049 to base game integrated circuit board 2003 and PIB 2009. The proximity and biometric devices and circuitry may be installed by upgrading a commercially available PIB 2009, such as a Bally iView™ unit. Coding executed on base game integrated circuit board 2003, PIB 2009, and/or GMU 2007 may be upgraded to integrate a game in accordance with one or more embodiments described herein, as is more fully described below.

Peripherals 2051 connect through I/O board 2053 to base game integrated circuit board 2003. For example, a bill/ticket acceptor is typically connected to a game input-output board 2053 which is, in turn, connected to a conventional central processing unit ("CPU") base game integrated circuit board 2003, such as an Intel Pentium microprocessor mounted on a gaming motherboard. I/O board 2053 may be connected to base game integrated circuit board 2003 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Base game integrated circuit board 2003 executes a game program that causes base game integrated circuit board 2003 to play a game. In one embodiment, the game program provides a slot machine game having adjustable multi-part indicia. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 2053 to base game integrated circuit board 2003 which, in turn, assigns an appropriate number of credits for play in accordance with the game program. The player may further control the operation of the gaming machine by way of other peripherals 2051, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 2000; for example, it may be part of a central determination host system which provides random game outcomes to the game program. Thereafter, the player may or may not interact with the game through electromechanical or touch screen buttons to change the displayed indicia. Finally, base game integrated circuit board 2003 under control of the game program and OS compares the final display of indicia to a pay table. The set of possible game outcomes may include a subset of outcomes related to the triggering of a feature game. In the event the displayed outcome is a member of this subset, base game integrated circuit board 2003, under control of the game program and by way of I/O Board 2053, may cause feature game play to be presented on a feature display.

Predetermined payout amounts for certain outcomes, including feature game outcomes, are stored as part of the game program. Such payout amounts are, in response to instructions from base game integrated circuit board 2003, provided to the player in the form of coins, credits or currency via I/O board 2053 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 2007 includes an integrated circuit board and GMU processor and memory including coding for network communications, such as the G2S (game-to-system) protocol from the Gaming Standards Association, Las Vegas, Nev., used for system communications over the network. As shown, GMU 2007 may connect to card reader 2055 through bus 2057 and may thereby obtain player card information and transmit the information over the network through bus 2041. Gaming activity information may be transferred by the base game integrated circuit board 2003 to GMU 2007 where the information may be translated into a network protocol, such as S2S, for transmission to a server, such as a player tracking server, where information about a player's playing activity may be stored in a designated server database.

PIB 2009 includes an integrated circuit board, PID processor, and memory which includes an operating system, such as Windows CE, a player interface program which may be executable by the PID processor together with various input/output (I/O) drivers for respective devices which connect to PIB 2009, such as player interface devices 2011, and which may further include various games or game components playable on PIB 2009 or playable on a connected network server and PIB 2009 is operable as the player interface. PIB 2009 connects to card reader 2055 through bus 2023, display 2059 through video decoder 2061 and bus 2021, such as an LVDS or VGA bus.

As part of its programming, the PID processor executes coding to drive display 2059 and provide messages and information to a player. Touch screen circuitry interactively connects display 2059 and video decoder 2061 to PIB 2009, such that a player may input information and cause the information to be transmitted to PIB 2009 either on the player's initiative or responsive to a query by PIB 2009. Additionally soft keys 2065 connect through bus 2017 to PIB 2009 and operate together with display 2059 to provide information or queries to a player and receive responses or queries from the player. PIB 2009, in turn, communicates over the CMS/SMS network through Ethernet switch 2031 and busses 2035, 2039 and with respective servers, such as a player tracking server.

Player interface devices 2011 are linked into the virtual private network of the system components in gaming machine 2001. The system components include the iView processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iView™ processing board and game monitoring unit (GMU) processing board. The GMU and iView™ can be combined into one like the commercially available Bally GTM iView device. This device may have a video mixing technology to mix the EGM processor's video signals with the iView display onto the top box monitor or any monitor on the gaming device.

Figure 21:
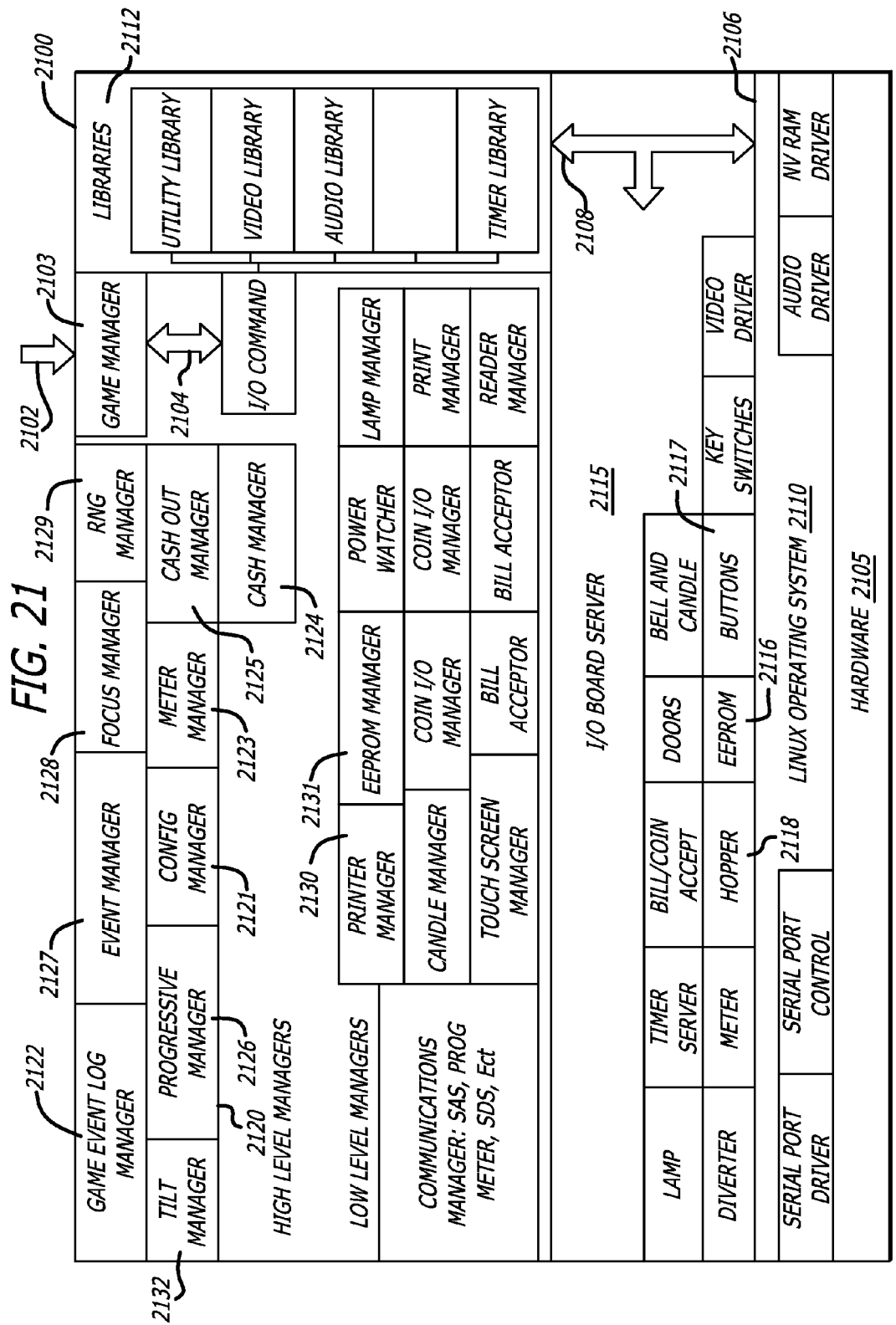
FIG. 21 illustrates a block diagram of the logical components of a gaming kernel in accordance with one or more embodiments.

In accordance with one or more embodiments, FIG. 21 is a functional block diagram of a gaming kernel 2100 of a game program under control of base game integrated circuit board 2103. The game program uses gaming kernel 2100 by calling into application programming interface (API) 2102, which is part of game manager 2103. The components of game kernel 2100 as shown in FIG. 21 are only illustrative, and should not be considered limiting. For example, the number of managers may be changed, additional managers may be added or some managers may be removed in other embodiments.

As shown in the example, there are three layers: a hardware layer 2105; an operating system layer 2110, such as, but not limited to, Linux; and a game kernel layer 2100 having game manager 2103 therein. In one or more embodiments, the use of a standard operating system 2110, such as a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 2100 executes at the user level of the operating system 2110, and itself contains a major component called the I/O Board Server 2115. To properly set the bounds of game application software (making integrity checking easier), all game applications interact with gaming kernel 2100 using a single API 2102 in game manager 2103. This enables game applications to make use of a well-defined, consistent interface, as well as making access points to gaming kernel 2100 controlled, where overall access is controlled using separate processes.

For example, game manager 2103 parses an incoming command stream and, when a command dealing with I/O comes in (arrow 2104), the command is sent to an applicable library routine 2112. Library routine 2112 decides what it needs from a device, and sends commands to I/O Board Server 2115 (see arrow 2108). A few specific drivers remain in operating system 2110's kernel, shown as those below line 2106. These are built-in, primitive, or privileged drivers that are (i) general (ii) kept to a minimum and (iii) are easier to leave than extract. In such cases, the low-level communications is handled within operating system 2110 and the contents passed to library routines 2112.

Thus, in a few cases library routines may interact with drivers inside operating system 2110, which is why arrow 2108 is shown as having three directions (between library utilities 2112 and I/O Board Server 2115, or between library utilities 2112 and certain drivers in operating system 2110). No matter which path is taken, the logic needed to work with each device is coded into modules in the user layer of the diagram. Operating system 2110 is kept as simple, stripped down, and common across as many hardware platforms as possible. The library utilities and user-level drivers change as dictated by the game cabinet or game machine in which it will run. Thus, each game cabinet or game machine may have a base game integrated circuit board 2103 connected to a unique, relatively dumb, and as inexpensive as possible I/O adapter board 2140, plus a gaming kernel 2100 which will have the game-machine-unique library routines and I/O Board Server 2115 components needed to enable game applications to interact with the gaming machine cabinet. Note that these differences are invisible to the game application software with the exception of certain functional differences (i.e., if a gaming cabinet has stereo sound, the game application will be able to make use of API 2102 to use the capability over that of a cabinet having traditional monaural sound).

Game manager 2103 provides an interface into game kernel 2100, providing consistent, predictable, and backwards compatible calling methods, syntax, and capabilities by way of game application API 2102. This enables the game developer to be free of dealing directly with the hardware, including the freedom to not have to deal with low-level drivers as well as the freedom to not have to program lower level managers 2130, although lower level managers 2130 may be accessible through game manager 2103's interface 2102 if a programmer has the need. In addition to the freedom derived from not having to deal with the hardware level drivers and the freedom of having consistent, callable, object-oriented interfaces to software managers of those components (drivers), game manager 2103 provides access to a set of upper level managers 2120 also having the advantages of consistent callable, object-oriented interfaces, and further providing the types and kinds of base functionality required in casino-type games. Game manager 2103, providing all the advantages of its consistent and richly functional interface 2102 as supported by the rest of game kernel 2100, thus provides a game developer with a multitude of advantages.

Game manager 2103 may have several objects within itself, including an initialization object (not shown). The initialization object performs the initialization of the entire game machine, including other objects, after game manager 2103 has started its internal objects and servers in appropriate order. In order to carry out this function, the kernel's configuration manager 2121 is among the first objects to be started; configuration manager 2121 has data needed to initialize and correctly configure other objects or servers.

The upper level managers 2120 of game kernel 2100 may include game event log manager 2122 which provides, at the least, a logging or logger base class, enabling other logging objects to be derived from this base object. The logger object is a generic logger; that is, it is not aware of the contents of logged messages and events. The log manager's (2122) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 2123 manages the various meters embodied in the game kernel 2100. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 2123 receives its initialization data for the meters, during start-up, from configuration manager 2121. While running, the cash in (2124) and cash out (2125) managers call the meter manager's (2123) update functions to update the meters. Meter manager 2123 will, on occasion, create backup copies of the soft meters by storing the soft meters' readings in EEPROM. This is accomplished by calling and using EEPROM manager 2131.

In accordance with still other embodiments, progressive manager 2126 manages progressive games playable from the game machine. Event manager 2127 is generic, like log manager 2122, and is used to manage various gaming machine events. Focus manager 2128 correlates which process has control of various focus items. Tilt manager 2132 is an object that receives a list of errors (if any) from configuration manager 2121 at initialization, and during game play from processes, managers, drivers, end the like, that may generate errors. Random number generator manager 2129 is provided to allow easy programming access to a random number generator (RNG), as a RNG is required in virtually all casino-style (gambling) games. RNG manager 2129 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 2125 has the responsibility of configuring and managing monetary output devices. During initialization, cash out manager 2125, using data from configuration manager 2121, sets the cash out devices correctly and selects any selectable cash out denominations. During play, a game application may post a cash out event through the event manager 2127 (the same way all events are handled), and using a call-back posted by cash out manager 2125, cash out manager 2125 is informed of the event. Cash out manager 2125 updates the credit object, updates its state in non-volatile memory, and sends an appropriate control message to the device manager that corresponds to the dispensing device. As the device dispenses dispensable media, there will typically be event messages being sent back and forth between the device and cash out manager 2125 until the dispensing finishes, after which cash out manager 2125, having updated the credit manager and any other game state (such as some associated with meter manager 2123) that needs to be updated for this set of actions, sends a cash out completion event to event manager 2127 and to the game application thereby. Cash in manager 2124 functions similarly to cash out manager 2125, only controlling, interfacing with, and taking care of actions associated with cashing in events, cash in devices, and associated meters and crediting.

In a further example, in accordance with one or more embodiments, I/O server 2115 may write data to the gaming machine EEPROM memory, which is located in the gaming machine cabinet and holds meter storage that must be kept even in the event of power failure. Game manager 2103 calls the I/O library functions to write data to the EEPROM. The I/O server 2115 receives the request and starts a low priority EEPROM thread 2116 within I/O server 2115 to write the data. This thread uses a sequence of 8 bit command and data writes to the EEPROM device to write the appropriate data in the proper location within the device. Any errors detected will be sent as IPC messages to game manager 2103. All of this processing is asynchronous.

In accordance with one embodiment, button module 2117 within I/O server 2115, polls (or is sent) the state of buttons every 2 ms. These inputs are debounced by keeping a history of input samples. Certain sequences of samples are required to detect a button was pressed, in which case the I/O server 2115 sends an inter-process communication event to game manager 2103 that a button was pressed or released. In some embodiments, the gaming machine may have intelligent distributed I/O which debounces the buttons, in which case button module 2117 may be able to communicate with the remote intelligent button processor to get the button events and simply relay them to game manager 2103 via IPC messages. In still another embodiment, the I/O library may be used for pay out requests from the game application. For example, hopper module 2118 must start the hopper motor, constantly monitor the coin sensing lines of the hopper, debounce them, and send an IPC message to the game manager 2103 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 22A:
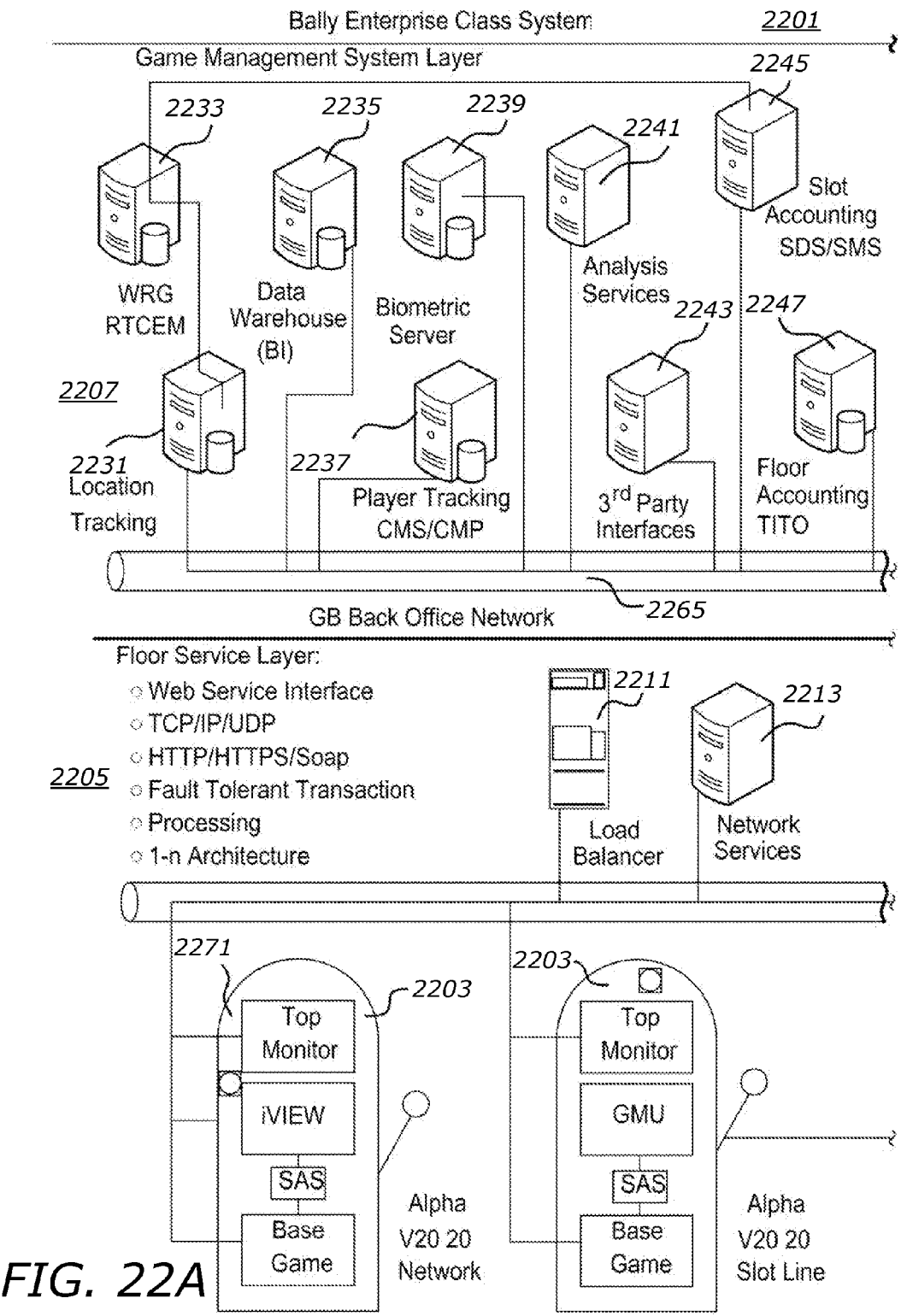
FIG. 22A illustrates a schematic block diagram showing the hardware elements of a networked gaming system in accordance with one or more embodiments.
Figure 22B:
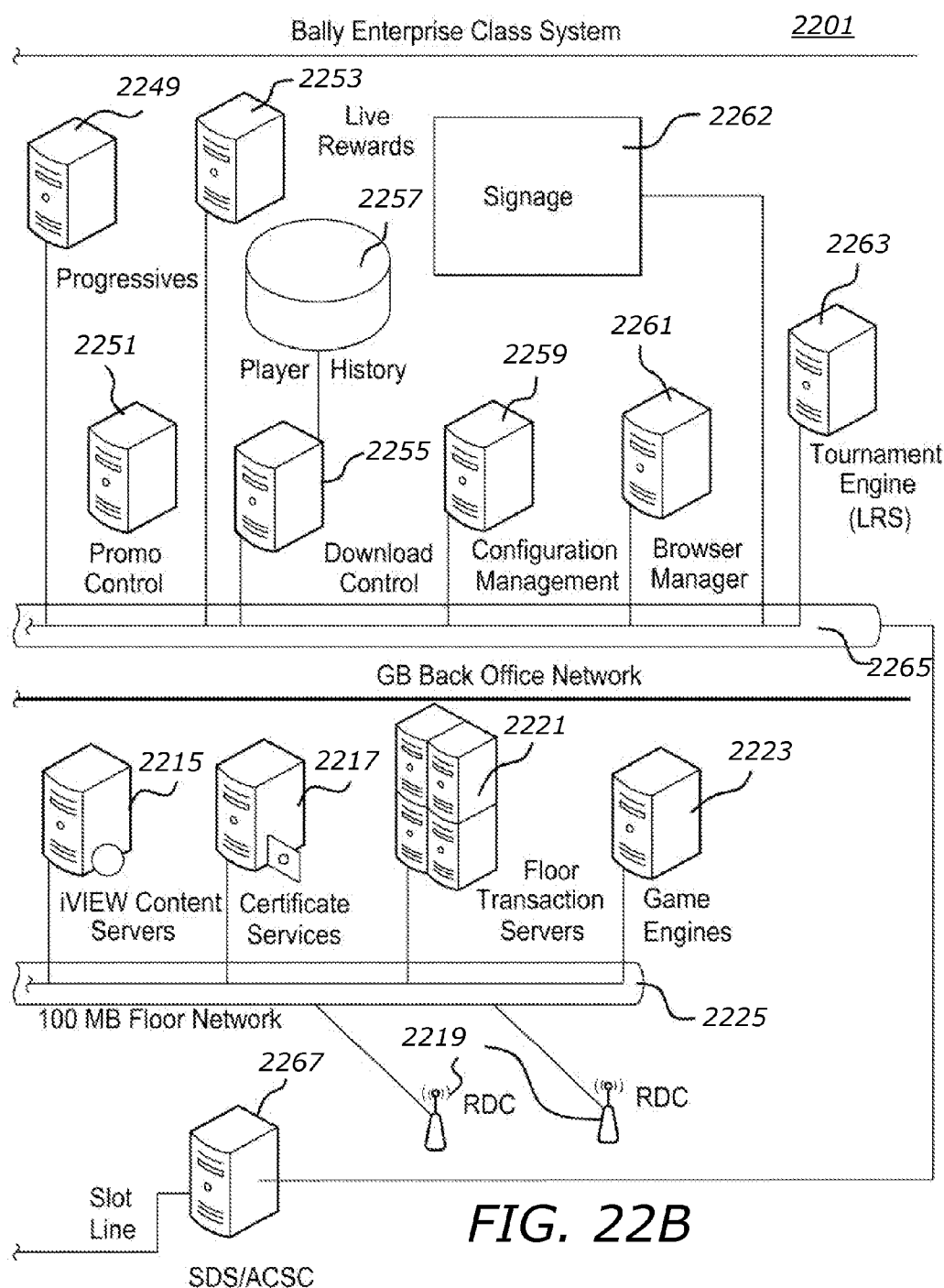
FIG. 22B illustrates a schematic block diagram showing the hardware elements of a networked gaming system in accordance with one or more embodiments.

Referring to FIGS. 22A and 22B, enterprise gaming system 2201 is shown in accordance with one or more embodiments. Enterprise gaming system 2201 may include one casino or multiple locations and generally includes a network of gaming machines 2203, floor management system (SMS) 2205, and casino management system (CMS) 2207. SMS 2205 may include load balancer 2211, network services servers 2213, player interface (iView) content servers 2215, certificate services server 2217, floor radio dispatch receiver/transmitters (RDC) 2219, floor transaction servers 2221 and game engines 2223, each of which may connect over network bus 2225 to gaming machines 2203. CMS 2207 may include location tracking server 2231, WRG RTCEM server 2233, data warehouse server 2235, player tracking server 2237, biometric server 2239, analysis services server 2241, third party interface server 2243, slot accounting server 2245, floor accounting server 2247, progressives server 2249, promo control server 2251, feature game (such as Bally Live Rewards) server 2253, download control server 2255, player history database 2257, configuration management server 2259, browser manager 2261, tournament engine server 2263 connecting through bus 2225 to server host 2267 and gaming machines 2203. The various servers and gaming machines 2203 may connect to the network with various conventional network connections (such as, for example, USB, serial, parallel, RS485, Ethernet). Additional servers which may be incorporated with CMS 2207 include a responsible gaming limit server (not shown), advertisement server (not shown), and a control station server (not shown) where an operator or authorized personnel may select options and input new programming to adjust each of the respective servers and gaming machines 2203. SMS 2205 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 2203 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 2207 and/or SMS 2205 servers and devices, firmware, media, operating systems, and configurations may be downloaded to the system components of respective gaming machines for upgrading or managing floor content and offerings in accordance with operator selections or automatically depending upon CMS 2207 and SMS 2205 master programming. The data and programming updates to gaming machines 2203 are authenticated using conventional techniques prior to install on the system components.

In various embodiments, any of the gaming machines 2203 may be a mechanical reel spinning slot machine or a video slot machine or a gaming machine offering one or more of the above described games including a group play game. Alternately, gaming machines 2203 may provide a game with a simulated musical instrument interface as a primary or base game or as one of a set of multiple primary games selected for play by a random number generator. A gaming system of the type described above also allows a plurality of games in accordance with the various embodiments to be linked under the control of a group game server (not shown) for cooperative or competitive play in a particular area, carousel, casino or between casinos located in geographically separate areas. For example, one or more examples of group games under control of a group game server are disclosed in U.S. Patent Publication No. 20080139305, entitled "Networked System and Method for Group Play Gaming," filed on Nov. 9, 2007, which is hereby incorporated by reference in its entirety for all purposes.

Figure 23:
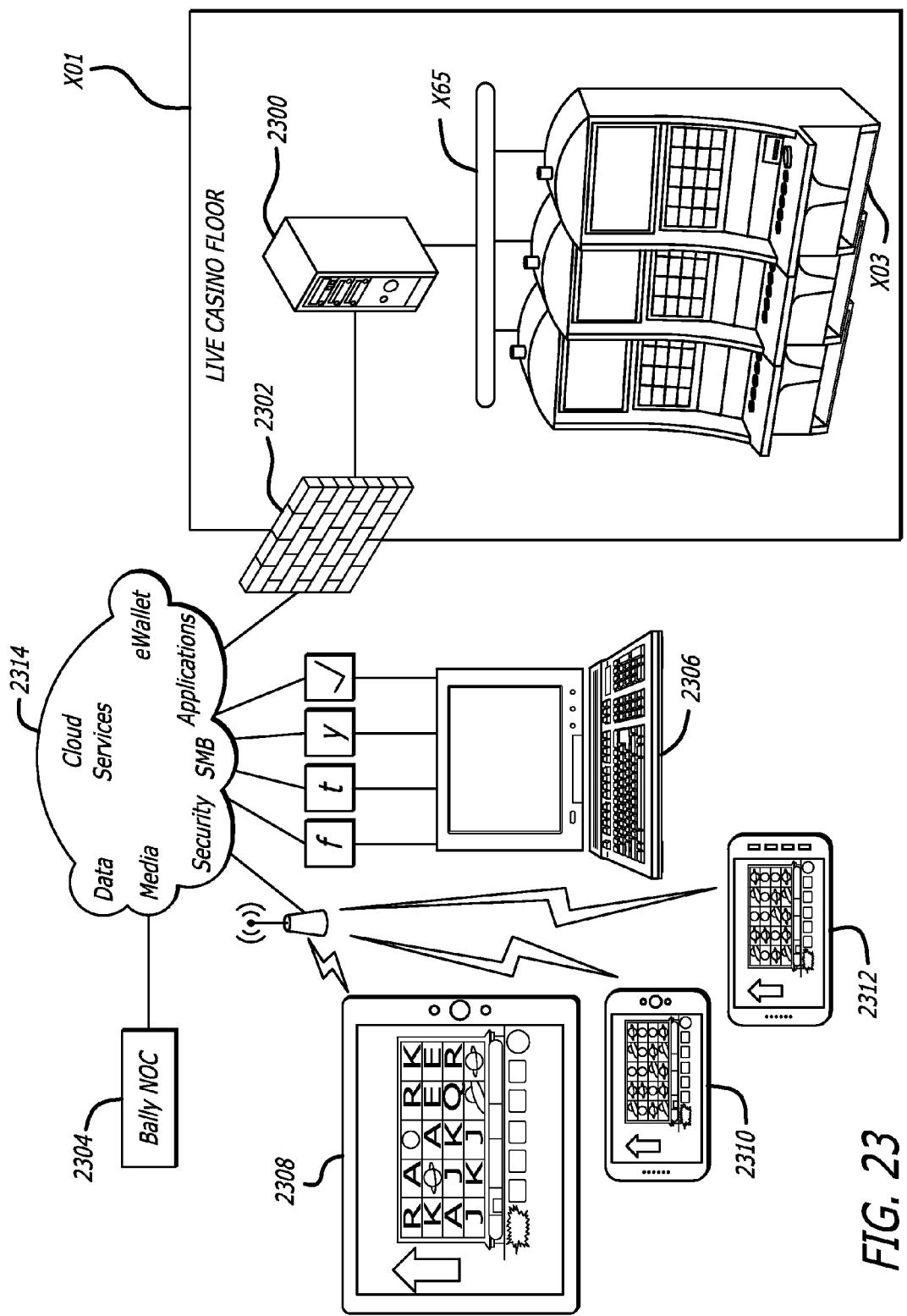
FIG. 23 illustrates a diagram showing an example of architecture for tying a casino enterprise network to an external provider of games and content to Internet or broadband communication capable devices.

All or portions of the disclosed embodiments may also be implemented or promoted by or through a system as suggested in FIG. 23. At 2201 is the gaming system of FIGS. 22A and 22B, which may be hosted at a casino property enterprise, across several casino enterprises or by a third party host. As described above, the gaming system 2201 has a network communication bus 2265 providing for communication between the gaming terminals 2203 and various servers. To provide the functionality illustrated in FIG. 23, a bonusing server 2300, such as a Bally Elite Bonusing Server is connected to the network communication bus 2265 (FIGS. 22A and 22B) for communication to the gaming system 2201, the gaming terminals 2203 and the various servers and other devices as described above. Through a secure network firewall 2302 the bonusing server 2300 is in communication with a cloud computing/storage service 2304 which may be hosted by the casino enterprise, a licensed third party or if permitted by gaming regulators an unlicensed provider. For example the cloud service 2304 may be as provided by Microsoft® Private Cloud Solutions offered by Microsoft Corp. of Redmond, Wash., USA. The cloud service 2304 provides various applications which can be accessed and delivered to, for example, personal computers 2306, portable computing devices such as computer tablets 2308, personal digital assistants (PDAs) 2310 and cellular devices 2312 such as telephones and smart phones. As but an example, the cloud service 2304 may store and host an eWallet application, casino or player-centric applications such as downloadable or accessible applications including games, promotional material or applications directed to and/or affecting a casino customers interaction with a casino enterprise (such as accessing the players casino account, establishing casino credit or the like), providing bonuses to players through system wide bonusing (SMB) or specific bonusing or comps to players, or other applications. The cloud service 2304 includes security provide for secure communication with the cloud service 2304 between the player/users and the cloud service 2304 and between the cloud service 2304 and the gaming system 2201. Security applications may be through encryption, the use of personal identification numbers (PINS) or other devices and systems. As suggested in FIG. 23, the cloud service 2314 stores player/user data retrieved from players/users and from the gaming system 2201.

The players/users may access the cloud service 2304 and the applications and data provided thereby through the Internet or through broadband wireless cellular communication systems and any intervening sort range wireless communication such as WiFi. The players/users may access the applications and data through various social media offerings such as Facebook, Twitter, Yelp, MySpace, LinkedIn or the like.

As but an example, a player/user may have a player account with a casino enterprise Z. That account may include data such as the player's credit level, their rating and their available comps. The account may further track any certificates, and the present value thereof, the player may have won as a result of the playing a game according to the disclosed embodiments. At their smart phone 2312 the player/user sends a request to the cloud service 2304 (perhaps through a previously downloaded application) to request the status of their available comps such as how many comp points they have and what may be available through redemption of those points (e.g. lodging, cash back, meals or merchandise). The application for the request may present casino promotions, graphics or other advertising to the player/user. The application, to support such a request, would typically require the player/user to enter a PIN. The cloud service 1004 forwards the inquiry to the bonusing servicer 2300 which, in turn, confirms the PIN and retrieves the requested information from the data warehouse 2235 (FIGS. 22A & 22B) or player tracking CMS/CMP server 2237 (FIGS. 22A & 22B). Alternatively, the data may be stored in the cloud service 2304 and routinely updated from the data warehouse 2235 or player tracking CMS/CMP server 2237. In this instance, the request would be responded to from data residing with the cloud service 2304. The information is formatted by the cloud server 2304 application and delivered to the player/user. The delivery may be formatted based upon the player/user's device operating system (OS), display size or the like.

The cloud service 2300 may also host game applications to provide virtual instances of games for free, promotional, or where permitted, P2P (Pay to Play) supported gaming. Third party developers may also have access to placing applications with the cloud service 2304 through, for example a national operations center (Bally NOC 2314). A game software manufacturer such as Bally Gaming, Inc. may also provide game applications on its own or on behalf of the casino enterprise.

Other media such as advertising, notices (such as an upcoming tournament) may also be provided to the cloud service 2304. When a player/user accesses the cloud service 2304 certain media may be delivered to the player/user in a manner formatted for their application and device.

The details of several embodiments are disclosed. For example, a slot machine, either electro-mechanical or video may operate one or more virtual games in the background and routinely report an outcome history to the player playing the primary, displayed, version of the game. The player may then compare the histories to the primary game and choose to instead play one of the one or more virtual background versions of the game. Each game version may operate from a differently seeded random number generator so the results (and histories may differ).

Still further the histories displays may be displayed at a window to either side, above or below the primary game version being wagered upon and played by the player or in a scrolling, ticker display again above or below or to either side of the primary game display. In such a fashion, the player may view the histories and select a version of the game which the player may feel is "hotter" and is having better outcomes.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

The invention claimed is:

1. A gaming device, comprising:
   one or more processors;
   one or more touch enabled video displays, at least a portion of one or more of the video displays including a touch enabled player button interface and a game selection interface; and
   a memory device storing instructions thereon that, when executed by the one or more processors, causes the one or more processors to, in a game selection mode:
   (i) control the one or more video displays to display a plurality of game icons at the game selection interface,
   (ii) receive selections by the player of at least a plurality of games for concurrent play by the player touching the selected games, each game having a wagering denomination and at least one game including a different wagering denomination,
   (iii) arrange and size the selected games into windows at one or more of the video displays, and
   (iv) arrange and display at the player button interface a button labeled and associated with each selected game for the player to input at least wager related instructions including the amount wagered for that game, and the memory device further storing instructions thereon that, when executed by the one or more processors, causes the one or more processors to, in a game play mode:

receive a prompt by the player at the button interface for concurrent play of the selected games, and issue awards based upon the game outcome and the wager instructions, and, the memory device further storing instructions thereon that, when executed by the one or more processors, causes the one or more processors to, in a game reconfiguration mode:

dynamically resize the windows based upon at least one or more of the denomination of a selected game, the wager amount, and a game play event; and the memory device further storing instructions thereon that, when executed by the one or more processors, causes the one or more processors to:

dynamically increase the size of the displayed window for a selected game when a player selects a wager denomination higher than other selected games.

2. The gaming device of claim 1, wherein one or more of the selected games has a bonus feature game event, and wherein the memory device further stores instructions thereon that when executed by one or more processors, causes the one or more processors to:

dynamically resize the size of a displayed window to occupy the one or more video displays for the presentation of the bonus.

3. The gaming device of claim 1, wherein two of the selected games each has a bonus feature game event, and wherein the memory device further stores instructions thereon that when executed by one or more processors, causes the one or more processors to:

dynamically and serially resize the size of a displayed window to significantly occupy the one or more video displays for the serial presentation of the bonuses.

4. The gaming device of claim 1, wherein the memory device further stores instructions thereon that when executed by one or more processors, causes the one or more processors to:

control the one or more displays to present the game icons in an animated presentation.

5. The gaming device of claim 4, wherein the memory device further stores instructions thereon that when executed by one or more processors, causes the one or more processors to:

control the one or more displays to display the game icons in an animated presentation of floating bubble icons which move over the one or more video displays.

6. The gaming device of claim 1, wherein the memory device further stores instructions thereon that when executed by one or more processors, causes the one or more processors to:

receive touch input from a player at the game selection interface to position a selected game window at the one or more video displays.

7. The gaming device of claim 1, wherein the memory device further stores instructions thereon that when executed by one or more processors, causes the one or more processors to, in a reconfiguration mode:

dynamically resize the windows based upon at least one or more of the denomination of a selected game, the wager amount, a game play event, and the display of messages.

8. The gaming device of claim 1, wherein the video display for the touch enabled player button interface is separate from the video display for the game selection interface.

9. A method of playing video games including one or more processors and one or more touch enabled video displays defining video game presentation video real estate and player button interface video real estate, the method comprising:

enabling the player to, at the one or more touch enabled video displays, touch-select from a plurality of displayed game selection icons, a plurality of games for concurrent play;

displaying at the one or more video displays, a display window for the play of each game, displaying at the player button interface for each game, an associated button for the player to input at least wager related instructions including the amount wagered for that game, dynamically sizing the windows based upon at least one or more of the denomination of a selected game, the wager amount and a game play event; and controlling the one or more video displays to concurrently display outcomes for the selected games upon the receipt of a prompt by the player, wherein each selected game has at least one available wagering denomination and at least one selected game has a different wagering denomination from another, the method further comprising dynamically increasing the size of a window for a selected game having a higher selected denomination.

10. The method of claim 9, further comprising enabling the player to, at the one or more touch enabled video displays, touch-select a plurality of games for concurrent play from an animated presentation of the plurality of displayed game selection icons moving about the one or more touch-enabled video displays.

11. The method of claim 10, further comprising enabling the player to, at the one or more touch enabled video displays, touch-select a plurality of games for concurrent play from an animated presentation of the plurality of displayed game selection bubble icons moving about the one or more touch enabled video displays.

12. The method of claim 9, wherein at least two of the selected games accept differing wager amounts, the method further comprising increasing the size of a window for a selected game having a higher wagered amount.

13. The method of claim 9, wherein a first touch enabled video display defines video game presentation video real estate and a second, separate touch enabled video display defines the player button interface, the method comprising:

enabling the player to, at the game presentation video display, touch-select from a plurality of displayed game selection icons a plurality of games for concurrent play;

displaying at the game presentation video display, a separate display window for play of each selected game; and displaying at the player button interface for each selected game, an associated button for the player to input at least wager related instructions including the amount wagered for that game.

14. The method of claim 13, further comprising enabling the player to, at the game presentation video display, touch-select a plurality of games for concurrent play from an animated presentation of the plurality of displayed game selection icons.

15. The method of claim 14, further comprising enabling the player to, at the game presentation video display, touch-select a plurality of games for concurrent play from an animated presentation of the plurality of displayed game selection icons moving about the game presentation video display.

16. A gaming device, comprising:
one or more processors;
a touch enabled game presentation video display;
a separate touch enabled video player button interface;
the one or more game processors configured, in a game selection phase, to:
  (i) control the game presentation video display to present a plurality of game icons at the game presentation video display,
  (ii) receive selections by the player of at least a plurality of games for concurrent play by the player touching the selected games displayed icons, each game having an associated wagering denomination and a wager range between a minimum and maximum wager,
  (iii) arrange and size the selected games into windows at the game presentation video display,
  (iv) arrange and display at the video player button interface a button labeled and associated with each selected game for the player to input at least wager related instructions including the amount wagered for that game,
the one or more processors configured, in a game play phase, to:
  (i) receive a prompt by the player at the video player button interface for concurrent play of the selected games; and
  (ii) issue awards based upon the game outcomes and the wager instructions, and
the one or more processors configured to dynamically resize the windows based upon at least one or more of the denomination of a selected game, the wager amount, and a game play event, and
wherein the one or more game processors are further configured to dynamically increase the size of the displayed window for a selected game based upon one or more of the denomination and wager amount.

17. The gaming device of claim 16, wherein one or more of the selected games has a bonus feature game event, the one or more game processors are further configured to dynamically increase the size of a displayed window for the presentation of the bonus.

* * * * *